US00RE42860E

(19) United States
(12) Reissued Patent
Velez-McCaskey et al.

(10) Patent Number: US RE42,860 E
(45) Date of Reissued Patent: Oct. 18, 2011

(54) UNIVERSAL STORAGE MANAGEMENT SYSTEM

(76) Inventors: Ricardo E. Velez-McCaskey, Nashua, NH (US); Gustavo Barillas-Trennert, Litchfield, NH (US)

(21) Appl. No.: 10/210,592

(22) Filed: Jul. 31, 2002

Related U.S. Patent Documents

Reissue of:
(64) Patent No.: 6,098,128
Issued: Aug. 1, 2000
Appl. No.: 08/714,846
PCT Filed: Sep. 17, 1996

U.S. Applications:
(60) Provisional application No. 60/003,920, filed on Sep. 18, 1995.

(51) Int. Cl.
*G06F 3/00* (2006.01)
*G06F 13/12* (2006.01)
*G06F 1/00* (2006.01)
*G06F 12/00* (2006.01)

(52) U.S. Cl. ..... 710/5; 710/65; 710/74; 713/300; 719/321; 707/822

(58) Field of Classification Search ..... None
See application file for complete search history.

(56) References Cited

U.S. PATENT DOCUMENTS

| | | | |
|---|---|---|---|
| 3,449,718 | A | 6/1969 | Woo |
| 3,876,978 | A | 4/1975 | Bossen et al. |
| 4,044,328 | A | 8/1977 | Herff |
| 4,092,732 | A | 5/1978 | Ouchi |
| 4,228,496 | A | 10/1980 | Katzman et al. |

(Continued)

FOREIGN PATENT DOCUMENTS

| | | | |
|---|---|---|---|
| EP | 0201330 | A2 | 11/1986 |
| EP | 0274817 | A2 | 7/1988 |
| GB | 2086625 | A | 5/1982 |
| JP | 56-074807 | | 6/1981 |
| JP | 57-185554 | | 11/1982 |

(Continued)

OTHER PUBLICATIONS

"Memorandum Opinion," *Storage Computer Corp.* v. *Veritas Software Corp, et al.*, Civil Action No. 3:01-CV-2078-N, in the United States District Court Northern District of Texas Dallas Division, (Jan. 27, 2003) pp. 1-14.

(Continued)

*Primary Examiner* — Alan Chen
(74) *Attorney, Agent, or Firm* — Pattric J. Rawlins; Procopio Cory Hargreaves & Savitch LLP

(57) ABSTRACT

A universal storage management system which facilitates storage of data from a client computer and computer network is disclosed. The universal storage management system functions as an interface between the client computer and at least one storage device, and facilitates reading and writing of data by handling I/O operations. I/O operation overhead in the client computer is reduced by translating I/O commands from the client computer into high level commands which are employed by the storage management system to carry out I/O operations. The storage management system also enables interconnection of a normally incompatible storage device and client computer by translating I/O requests into an intermediate common format which is employed to generate commands which are compatible with the storage device receiving the request. Files, error messages and other information from the storage device are similarly translated and provided to the client computer.

85 Claims, 26 Drawing Sheets

U.S. PATENT DOCUMENTS

| | | | | |
|---|---|---|---|---|
| 4,410,942 | A | | 10/1983 | Milligan et al. |
| 4,425,615 | A | | 1/1984 | Swenson et al. |
| 4,433,388 | A | | 2/1984 | Oosterbaan |
| 4,467,421 | A | | 8/1984 | White |
| 4,590,559 | A | | 5/1986 | Baldwin et al. |
| 4,636,946 | A | | 1/1987 | Hartung et al. |
| 4,644,545 | A | | 2/1987 | Gershenson |
| 4,656,544 | A | | 4/1987 | Yamanouchi |
| 4,722,085 | A | | 1/1988 | Flora et al. |
| 4,761,785 | A | | 8/1988 | Clark et al. |
| 4,800,483 | A | | 1/1989 | Yamamoto et al. |
| 4,817,035 | A | | 3/1989 | Timsit |
| 4,849,929 | A | | 7/1989 | Timsit |
| 4,849,978 | A | | 7/1989 | Dishon et al. |
| 4,903,218 | A | | 2/1990 | Longo et al. |
| 4,933,936 | A | | 6/1990 | Rasmussen et al. |
| 4,934,823 | A | | 6/1990 | Okami |
| 4,942,579 | A | | 7/1990 | Goodlander et al. |
| 4,993,030 | A | | 2/1991 | Krakauer et al. |
| 4,994,963 | A | | 2/1991 | Rorden et al. |
| 5,072,378 | A | | 12/1991 | Manka |
| 5,134,619 | A | | 7/1992 | Henson et al. |
| 5,148,432 | A | | 9/1992 | Gordon et al. |
| RE34,100 | E | | 10/1992 | Hartness |
| 5,163,131 | A | | 11/1992 | Row et al. |
| 5,197,139 | A | | 3/1993 | Emma et al. |
| 5,210,824 | A | | 5/1993 | Putz et al. |
| 5,220,569 | A | | 6/1993 | Hartness |
| 5,257,367 | A | | 10/1993 | Goodlander et al. |
| 5,274,645 | A | | 12/1993 | Idleman et al. |
| 5,285,451 | A | | 2/1994 | Henson et al. |
| 5,301,297 | A | | 4/1994 | Menon et al. |
| 5,305,326 | A | | 4/1994 | Solomon et al. |
| 5,313,631 | A | | 5/1994 | Kao |
| 5,315,708 | A | | 5/1994 | Eidler et al. |
| 5,317,722 | A | | 5/1994 | Evans |
| 5,329,619 | A | | 7/1994 | Pagé et al. |
| 5,333,198 | A | | 7/1994 | Houlberg et al. |
| 5,355,453 | A | | 10/1994 | Row et al. |
| 5,367,647 | A | | 11/1994 | Coulson et al. |
| 5,371,743 | A | | 12/1994 | DeYesso et al. |
| 5,392,244 | A | | 2/1995 | Jacobson et al. |
| 5,396,339 | A | | 3/1995 | Stern et al. |
| 5,398,253 | A | | 3/1995 | Gordon |
| 5,412,661 | A | | 5/1995 | Hao et al. |
| 5,416,915 | A | | 5/1995 | Mattson et al. |
| 5,418,921 | A | | 5/1995 | Cortney et al. |
| 5,420,998 | A | | 5/1995 | Horning |
| 5,423,046 | A | | 6/1995 | Nunnelley et al. |
| 5,428,787 | A | | 6/1995 | Pineau |
| 5,440,716 | A | | 8/1995 | Schultz et al. |
| 5,452,444 | A | | 9/1995 | Solomon et al. |
| 5,469,453 | A | | 11/1995 | Glider et al. |
| 5,483,419 | A | | 1/1996 | Kaczeus, Sr. et al. |
| 5,485,579 | A | | 1/1996 | Hitz et al. |
| 5,495,607 | A | | 2/1996 | Pisello et al. |
| 5,499,337 | A | | 3/1996 | Gordon |
| 5,513,314 | A | | 4/1996 | Kandasamy et al. |
| 5,519,831 | A | | 5/1996 | Holzhammer |
| 5,519,844 | A | | 5/1996 | Stallmo |
| 5,519,853 | A | | 5/1996 | Moran et al. |
| 5,524,204 | A | | 6/1996 | Verdoorn, Jr. |
| 5,530,829 | A | | 6/1996 | Beardsley et al. |
| 5,530,845 | A | | 6/1996 | Hiatt et al. |
| 5,535,375 | A | | 7/1996 | Eshel et al. |
| 5,537,534 | A | | 7/1996 | Voigt et al. |
| 5,537,567 | A | | 7/1996 | Galbraith et al. |
| 5,537,585 | A | * | 7/1996 | Blickenstaff et al. ..... 1/1 |
| 5,537,588 | A | | 7/1996 | Engelmann et al. |
| 5,542,064 | A | | 7/1996 | Tanaka et al. |
| 5,542,065 | A | | 7/1996 | Burkes et al. |
| 5,544,347 | A | | 8/1996 | Yanai et al. |
| 5,546,558 | A | | 8/1996 | Jacobson et al. |
| 5,551,002 | A | | 8/1996 | Rosich et al. |
| 5,551,003 | A | | 8/1996 | Mattson et al. |
| 5,559,764 | A | | 9/1996 | Chen et al. |
| 5,564,116 | A | | 10/1996 | Arai et al. |
| 5,568,628 | A | | 10/1996 | Satoh et al. |
| 5,572,659 | A | | 11/1996 | Iwasa et al. |
| 5,572,660 | A | | 11/1996 | Jones |
| 5,574,851 | A | | 11/1996 | Rathunde |
| 5,579,474 | A | | 11/1996 | Kakuta et al. |
| 5,581,726 | A | | 12/1996 | Tanaka |
| 5,583,876 | A | | 12/1996 | Kakuta |
| 5,586,250 | A | | 12/1996 | Carbonneau et al. |
| 5,586,291 | A | | 12/1996 | Lasker et al. |
| 5,611,069 | A | | 3/1997 | Matoba |
| 5,615,352 | A | | 3/1997 | Jacobson et al. |
| 5,615,353 | A | | 3/1997 | Lautzenheiser |
| 5,617,425 | A | | 4/1997 | Anderson |
| 5,621,882 | A | | 4/1997 | Kakuta |
| 5,632,027 | A | | 5/1997 | Martin et al. |
| 5,634,111 | A | | 5/1997 | Oeda et al. |
| 5,642,337 | A | | 6/1997 | Oskay et al. |
| 5,649,152 | A | | 7/1997 | Ohran et al. |
| 5,650,969 | A | | 7/1997 | Niijima et al. |
| 5,657,468 | A | | 8/1997 | Stallmo et al. |
| 5,659,704 | A | | 8/1997 | Burkes et al. |
| 5,664,187 | A | | 9/1997 | Burkes et al. |
| 5,671,439 | A | | 9/1997 | Klein et al. |
| 5,673,412 | A | | 9/1997 | Kamo et al. |
| 5,678,061 | A | | 10/1997 | Mourad |
| 5,680,574 | A | | 10/1997 | Yamamoto et al. |
| 5,687,390 | A | | 11/1997 | McMillan, Jr. |
| 5,689,678 | A | | 11/1997 | Stallmo et al. |
| 5,696,931 | A | | 12/1997 | Lum et al. |
| 5,696,934 | A | | 12/1997 | Jacobson et al. |
| 5,699,503 | A | | 12/1997 | Bolosky et al. |
| 5,701,516 | A | | 12/1997 | Cheng et al. |
| 5,708,828 | A | | 1/1998 | Coleman |
| 5,720,027 | A | | 2/1998 | Sarkozy et al. |
| 5,732,238 | A | | 3/1998 | Sarkozy |
| 5,734,812 | A | | 3/1998 | Yamamoto et al. |
| 5,737,189 | A | | 4/1998 | Kammersgard et al. |
| 5,742,762 | A | | 4/1998 | Scholl et al. |
| 5,742,792 | A | | 4/1998 | Yanai et al. |
| 5,758,074 | A | | 5/1998 | Marlin et al. |
| 5,761,402 | A | | 6/1998 | Kaneda et al. |
| 5,774,641 | A | | 6/1998 | Islam et al. |
| 5,778,430 | A | | 7/1998 | Ish et al. |
| 5,787,459 | A | | 7/1998 | Stallmo et al. |
| 5,790,774 | A | | 8/1998 | Sarkozy |
| 5,794,229 | A | | 8/1998 | French et al. |
| 5,802,366 | A | | 9/1998 | Row et al. |
| 5,809,224 | A | | 9/1998 | Schultz et al. |
| 5,809,285 | A | | 9/1998 | Hilland |
| 5,812,753 | A | | 9/1998 | Chiariotti |
| 5,815,648 | A | | 9/1998 | Giovannetti |
| 5,819,292 | A | | 10/1998 | Hitz et al. |
| 5,857,112 | A | | 1/1999 | Hashemi et al. |
| 5,872,906 | A | | 2/1999 | Morita et al. |
| 5,875,456 | A | | 2/1999 | Stallmo et al. |
| 5,890,204 | A | | 3/1999 | Ofer et al. |
| 5,890,214 | A | | 3/1999 | Espy et al. |
| 5,890,218 | A | | 3/1999 | Ogawa et al. |
| 5,911,150 | A | | 6/1999 | Peterson et al. |
| 5,931,918 | A | | 8/1999 | Row et al. |
| 5,944,789 | A | | 8/1999 | Tzelnic et al. |
| 5,948,110 | A | | 9/1999 | Hitz et al. |
| 5,963,962 | A | | 10/1999 | Hitz et al. |
| 5,966,510 | A | | 10/1999 | Carbonneau et al. |
| 6,038,570 | A | | 3/2000 | Hitz et al. |
| 6,052,797 | A | | 4/2000 | Ofek et al. |
| 6,073,222 | A | | 6/2000 | Ohran |
| 6,076,142 | A | | 6/2000 | Corrington et al. |
| 6,148,142 | A | | 11/2000 | Anderson |

FOREIGN PATENT DOCUMENTS

| | | | |
|---|---|---|---|
| JP | 59-085564 | | 5/1984 |
| JP | 60-254318 | | 12/1985 |
| JP | 61-62920 | A | 3/1986 |

| | | |
|---|---|---|
| JP | 63-278132 | 11/1988 |
| JP | 02-148125 | 6/1990 |

OTHER PUBLICATIONS

"Expert Report of Steven Scott," *Storage Computer Corp.* v. *Veritas Software Corp. and Veritas Software Global Corporation*, Civil Action No. 3:01-CV-2078-N, in the United States District Court for the Northern District of Texas Dallas Division, (Mar. 14, 2003) pp. 1-32.

Klorese, R., "Enhancing Hardware RAID with Veritas Volume Manager," Veritas (1994) 7 pages.

Stonebraker, M., et al., "Distributed RAID—A New Multiple Copy Algorithm," Proc. of the 6th International Conference on Data Engineering, (Feb. 1990) pp. 1-24.

"Reliability, Availability, and Serviceablility in the SPARCcenter 2000E and the SPARCserver 1000E," Sun Technical White Paper, (Jan. 1995) pp. 1-20.

Callaghan, B., et al., "NFS Version 3 Protocol Specification," Sun Microsystems, Inc., (Jun. 1995) pp. 1- 126.

Leach, P., et al., "CIFS: A Common Internet File System," Microsoft Internet Developer, (Nov. 1996) pp. 1-10.

Pawlowski, B., et al., "NFS Version 3 Design and Implementation," Usenix Technical Conference (Jun. 9, 1994) pp. 1-15.

Sandberg, R., et al., "Design and Implementation of the Sun Network File System," Usenix Technical Conference, (1985) pp. 1-12.

Walsh, D., et al., "Overview of the Sun Network File System," Usenix Technical Conference, (1985) pp. 117-124.

Tanenbaum, A., "Distributed Operating Systems," New Jersey, Prentice Hall (1995).

Sandberg, Russel, "The Sun Network Filesystem: Design, Implementation and Experience," Sun Microsystems, Inc., Mountain View, California, 1986, pp. 1-16.

Bhide, Anupam, et al., "Implicit Replication in a Network File Server," *Proceedings of the Workshop on Management of Replicated Data,* IEEE, Los Alamites, California, Nov. 1990, pp. 85-90.

RFC 1094—NFS: Network File System Protocol specification, obtained at http://www.faqs.org/rfcs/rfc1094.html, published by Sun Microsystems, Inc., Mountain View, California, Mar. 1989, pp. 1-27.

RFC 1057—RPC: Remote Procedure Call Protocol specification: Version 2, obtained at http://www.faqs.org/rfcs/rfc1057.html, published by Sun Microsystems, Inc., Mountain View, California Jun. 1988, pp. 1-25.

RFC 1014—XDR: External Data Representation standard, obtained at http://www.faqs.org/rfcs/rfc1014.html, published by Sun Microsystems, Inc., Mountain View, California Jun. 1987, pp. 1-20.

Hitz, Dave, et al, File System Design for an NFS File Server Appliance, in *Proceedings of the USENIX Winter Technical Conference,* USENIX Association, San Francisco, CA, USA, Jan. 1994, 14 pages.

*Data Network Storage Corporation* v. *Hewlett-Packard Company, Dell Inc., and Network Appliance, Inc.,* Civil Action No. 3-08-CV-0294-N, In the United States District Court for the Northern District of Texas, Dallas Division, Defendent's Invalidity Contentions.

Abrahams et al., "An Overview of the Pathworks Product Family," Digital Technical Journal, vol. 4, No. 1, pp. 8-14 (Winter 1992) ("Abrahams") (§ 102(a)-(b)).

Bresnahan et al., "Pathworks for VMS File Server," Digital Technical Journal, vol. 4, No. 1, pp. 15-23 (Winter 1992) ("Bresnahan") (§ 102(a)-(b)).

IEEE Storage System Standards Working Group, "Reference Model for Open Storage Systems Interconnection, Mass Storage System Reference Model, Version 5," pp. 9-37 (Lester Buck, Sam Coleman, Rich Garrison & Dave Isaac eds., Sep. 8, 1994) ("OSSI Model") (§ 102(a)-(b)).

Cate, "Alex—A Global Filesystem," Proceedings of the USENIX File Systems Workshop, pp. 1-11 (Ann Arbor, Michigan, May 21-22, 1992) ("Cate") (§ 102(a)-(b)).

Cheriton, "UIO: A Uniform I/O System Interface for Distributed Systems," ACM Transactions on Computer Systems, vol. 5, No. 1, pp. 12-46 (Feb. 1987) ("Cheriton") (§ 102(a)-(b)).

IEEE Technical Committee on Mass Storage Systems and Technology, "Mass Storage System Reference Model: Version 4," pp. 1-38 (Sam Coleman & Steve Miller eds., May 1990) ("Mass Storage Systems") (§ 102(a)-(b)).

Coyne et al., "The High Performance Storage System," Proceedings of Supercomputing '93, pp. 83-92 (Portland, Oregon, Nov. 15-19, 1993) ("Coyne") (§ 102(a)-(b)).

Drapeau et al., "RAID-II: A High-Bandwidth Network File Server," Proceedings of the 21st Annual International Symposium on Computer Architecture, pp. 234-244 (Chicago, Illinois, Apr. 18-21, 1994) ("Drapeau") (§ 102(a)-(b)).

Hitz et al., "File System Design for an NFS File Server Appliance," Proceedings of the USENIX Winter 1994 Technical Conference, pp. NET 006539-006551 (San Francisco, California, Jan. 17-21, 1994) ("Hitz I") (§ 102(a)-(b)).

Hitz, "An NFS File Server Appliance," Network Appliance Technical Report, Rev. B, pp. 1-9 (Dec. 1994) ("Hitz 11") (§ 102(a)).

Katz, "Network-Attached Storage Systems," Proceedings of the Scalable High Performance Computing Conference, SHPCC-92, pp. 68-75 (Williamsburg, Virginia, Apr. 26-29, 1992) ("Katz I") (§ 102(a)-(b)).

Katz, "High-Performance Network and Channel Based Storage," Proceedings of the IEEE, vol. 80, No. 8, pp. 1238-1261 (Aug. 1992) ("Katz II") (§ 102(a)-(b)).

Kronenberg et al., "The VAXcluster Concept: An Overview of a Distributed System," Digital Technical Journal, No. 5,, pp. 7-21 (Sep. 1987) ("Kronenberg") (§ 102(a)-(b)).

Levy et al., "Distributed File Systems: Concepts and Examples," ACM Computing Surveys, vol. 22, No. 4, pp. 321-374 (Dec. 1990) ("Levy") (§ 102(a)-(b)).

Macklem, "Lessons Learned Tuning the 4.3BSD Reno Implementation of the NFS Protocol," Proceedings of the Winter 1991 USENIX Conference, pp. 53-64 (Dallas, Texas, Jan. 21-25, 1991) ("Macklem") (§ 102(a)-(b)).

Miller, "A Reference Model for Mass Storage Systems," Advances in Computers, vol. 27, pp. 157-210 (Marshall C. Yovits ed., 1988) ("Miller") (§ 102(a)-(b)).

Novell, Inc., "NetWare Concepts," NetWare 3.12 Networking Software, www.novell.com/documentation, 300 pages (Jul. 1993) ("NetWare Concepts") (§ 102(a)-(b)).

Novell, Inc., "NetWare Installation and Upgrade," NetWare 3.12 Networking Software, www.novell.com/documentation, 316 pages (Jul. 1993) ("NetWare Installation and Upgrade") (§ 102(a)-(b)).

Novell, Inc., "NetWare Overview," NetWare 3.12 Networking Software, www.novell.com/documentation, 44 pages (Jul. 1993) ("NetWare Overview") (§102(a)-(b)).

Novell, Inc., "NetWare System Administration," Net Ware 3.12 Networking Software, www.novell.com/documentation, 452 pages (Jul. 1993) ("NetWare System Administration") (§ 102(a)-(b)).

Novell, Inc., "NetWare Workstation Basics and Installation," NetWare 3.12 Networking Software, www.novell.comidocumentation, 136 pages (Jul. 1993) ("NetWare Workstation Basics and Installation") (§ 102(a)-(b)).

Pawlowski et al., "Network Computing in the UNIX and IBM Mainframe Environment," UniForum 1989 Conference Proceedings, pp. 287-302 (San Francisco, California, Feb. 27-Mar. 2, 1989) ("Pawlowski") (§ 102(a)-(b)).

Ramakrishnan et al., "A Model of File Server Performance for a Heterogeneous Distributed System," Proceedings of the ACM SIGCOMM Conference on Communications, Architectures & Protocols, Computer Communication Review, vol. 16, No. 3, pp. 338-347 (Stowe, Vermont, Aug. 5-7, 1986) ("Ramalcrishnan") (§ 102(a)-(b)).

Rao et al., "Accessing Files in an Internet: The Jade File System," IEEE Transactions on Software Engineering, vol. 19, No. 6, pp. 613-624 (Jun. 1993) ("Rao") (§ 102(a)-(b)).

Sun Microsystems, Inc., "NFS: Network File System Protocol Specification," Network Working Group, Request for Comments: 1094, pp. 1-27 (Mar. 1989) ("RFC 1094") (§102(a)-(b)).

Callaghan et al., "NFS Version 3 Protocol Specification," Network Working Group, Request for Comments: 1813, pp. 1-126 (Jun. 1995) ("RFC 1813") (§ 102(a)-(b)).

Sandberg et al., "Design and Implementation of the Sun Network Filesystem," USENIX Summer Conference Proceedings, pp. 119-130 (Portland, Oregon, Jun. 11-14, 1985) ("Sandberg I") (§ 102(a)-(b)).
Sandberg, "The Sun Network Filesystem: Design, Implementation and Experience," EUUG Conference Proceedings, 17 pages (Florence, Italy, Spring 1986) ("Sandberg 11") (§ 102(a)-(b)).
Satyanarayanan, "A Survey of Distributed File Systems," Annual Review of Computer Science, vol. 4, pp. 73-104 (1989-1990) ("Satyanarayanan") (§ 102(a)-(b)).
Sidhu et al., Inside AppleTalk (2c1 ed., Addison-Wesley Publishing Company, Inc., 1990) ("Sidhu") (§ 102(a)-(b)).
Sun Microsystems, Inc., "NFS: Network File System Version 3 Protocol Specification," pp. 1-94 (Feb. 16, 1994) ("Sun") (§ 102(a)-(b)).
Svobodova, "File Servers for Network-Based Distributed Systems," Computing Surveys, vol. 16, No. 4, pp. 353-398 (Dec. 1984) ("Svobodova") (§ 102(a)-(b)).
Tanenbaum, Distributed Operating Systems (Addison Wesley Longman (Singapore) Pte. Ltd., Aug. 25, 1994) ("Tanenbaum") (§ 102(a)-(b)).
Walker et al., "The LOCUS Distributed Operating System," Proceedings of the Ninth ACM Symposium on Operating Systems Principles, Operating Systems Review, vol. 17, No. 5, pp. 49-70 (Bretton Woods, New Hampshire, Oct. 10-13, 1983) ("Walker") (§ 102(a)-(b)).
Walsh et al., "Overview of the Sun Network File System," Proceedings of the USENIX Winter Conference, pp. 117-124 (Dallas, Texas, Jan. 23-25, 1985) ("Walsh") (§ 102(a)-(b)).
Watson et al., "The Parallel I/O Architecture of the High-Performance Storage System (HPSS)," Proceedings of the Fourteenth IEEE Symposium on Mass Storage Systems, Storage—At the Forefront of Information Infrastructures, pp. 27-44 (Monterey, California, Sep. 11-14, 1995) ("Watson") (§ 102(a)).
X/Open Company Limited, Technical Standard, Protocols for X/Open PC Interworking• SMB, Version 2 (Sep. 1992) ("X/Open SMB") (§ 102(a)-(b)).
X/Open Company Limited, CAE Specification, Protocols for X/Open Interworking: XNFS, Issue 4 (Sep. 1992) ("X/Open XNFS") (§ 102(a)-(b)).
Heywood et al., Inside NetWare 3.12, Fifth Edition (New Riders Publishing, Sep. 1995) ("Heywood") (§ 102(a)).
Lawrence et al., Using Netware 3.12, Special Edition (Que Corp. 1994) ("Lawrence") (§ 102(a)-(b)).
Massiglia, P., "RAID Levels—Yesterday's Yardstick," Computer Technology Review, Apr. 1996, p. 42.
Patterson, D. A., et al., "A Case for Redundant Arrays of Inexpensive Disks (RAID)," Computer Science Division (EECS), University of California, Berkeley, CA 94720, Report No. UCB/CSD 87/391, Dec. 1987.
Massiglia, Paul, ed., "The RAIDbook—A Source Book for Disk Array Technology, 4th Ed.," The RAID Advisory Board, St. Peter, MN, Aug. 8, 1994, pp. 3-22, 117-153.
Devoe, D., "Vendors to Unveil RAID Storage Systems, Storage Dimensions' SuperFlex 3000, Falcon Systems' ReelTime," (Brief Article), Infoworld, Mar. 25, 1996, v188 n13, p. 42(1).
"HP's Smart Auto-RAID Backup Technology," Newsbytes, pNEW08040012, Aug. 4, 1995.
Crowthers, E., et al., "RAID Technology Advances to the Next Level," Computer Technology Review, Mar. 1996, v16 n3, p. 46.
"Fault-Tolerant Storage for Non-Stop Networks," Storage Dimensions, Aug. 15, 1995, pp. 42-43.
"SuperFlex 3000 Provides Dynamic Growth," InfoWorld, Product Review, Jun. 17, 1996, v18 n25 p. N13.
Bhargava, B., et al., "Adaptability Experiments in the RAID Distributed Database System," (Abstract only), Proceedings of the 9th Symposium on Reliable Distributed Systems, Oct. 9-11, 1990, IEEE cat n 90CH2912-4, pp. 76-85.
Hsiao, H., et al., "Chained Declustering: A New Availability Strategy for Multiprocessor Database Machines," Computer Sciences Department, University of Wisconsin, Madison, WI 53706, 1990, pp. 456-465.
Li, Chung-Sheng, et al., "Combining Replication and Parity Approaches for Fault-Tolerant Disk Arrays," IBM Thomas J. Watson Research Center, P.O. Box 704, Yorktown Heights, NY 10598, Apr. 1994, pp. 360-367.
"Optimal Data Allotment to Build High Availability and High Performance Disk Arrays," IBM Technical Disclosure Bulletin, May 1994, pp. 75-80.
Kim, M.Y., "Synchronized Disk Interleaving," IEEE Transactions on Computers, vol. C-35, No. 11, Nov. 1986, pp. 978-988.
"LANser MRX100: Intelligent Disk Subsystem," Sanyo Icon, 1992, (2 pages).
"LANser MRX300: Intelligent Disk Subsystem," Sanyo Icon, 1992, (2 pages).
"LANser MRX500: Intelligent Disk Subsystem," Sanyo Icon, 1992, (2 pages).
"LANser MRX500FT: Fault Tolerant Intelligent Disk Subsystem," Sanyo Icon, 1992, (2 pages).
"LANser MRX: A New Network Technology Breakthrough," Sanyo Icon, 1992, (5 pages).
"Method for Scheduling Writes in a Duplexed DASD Subsystem," IBM Technical Disclosure Bulletin, vol. 29, No. 5, Oct. 1986, pp. 2102-2107.
"Managing Memory to DASD Data Recording," IBM Technical Disclosure Bulletin, Apr. 1983, pp. 5484-5485.
Jilke, Willi, "Disk Array Mass Storage Systems: The New Opportunity," Sep. 30, 1986.
Lawlor, F. D., "Efficient Mass Storage Parity Recovery Mechanism," IBM Technical Disclosure Bulletin, vol. 24, No. 2, Jul. 1981, pp. 986-987.
"Bidirectional Minimum Seek," IBM Technical Disclosure Bulletin, Sep. 1973, pp. 1122-1126.
Memos to ANSI X3T9.2 from Committee on Command Queueing, including revision 2 dated Jun. 16, 1987 and revision 4 dated Oct. 1, 1987.
La Violette, P., et al., "MCU Architecture Facilitates Disk Controller Design," Wescon Proceedings, San Francisco, vol. 29, Nov. 19-22, 1985, pp. 1-9.
Davy, L. N., et al., "Dual Movable-Head Assemblies," Research Disclosure, No. 15306, Jan. 1977, pp. 6-7.
Scooros, T., "Single-Board Controller Interfaces Hard Disks and Backup Media," Electronics International, vol. 54, No. 10, May 19, 1981, pp. 160-163.
Ito, Y., et al., "800 Mega Byte Disk Storage System Development," Review of the Electrical Communication Laboratories, vol. 28, Nos. 5-6, May-Jun. 1980, pp. 361-367.
Moren, B., "Mass Storage Controllers and Multibus® II," Conference Record, Sessions presented at Electro/87 and Mini/Micro Northeast-87, Apr. 7-9, 1987, pp. 1-8.
Kim, M. Y., "Parallel Operation of Magnetic Disk Storage Devices: Synchronized Disk Interleaving," Proceedings in the Fourth International Workshop on Data Base Machines, 1985, pp. 300-329.
Brickman, N.F., et al., "Error-Correction System for High-Data Rate Systems," IBM Technical Disclosure Bulletin, vol. 15, No. 4, Sep. 1972, pp. 1128-1130.
Gifford, C.E., et al., "Memory Board Address Interleaving," IBM Technical Disclosure Bulletin, vol. 17, No. 4, Sep. 1974, pp. 993-995.
Barsness, A. R., et al., "Longitudinal Parity Generation for Single-Bit Error Correction," IBM Technical Disclosure Bulletin, vol. 24, No. 6, Nov. 1981, pp. 2769-2770.
Moren, Bill, "SCSI-2 and Parallel Disk Drive Arrays," Technology Update, 1991, Ciprico, Plymouth, MN.
Moren, Bill, "SCSI-2 A Primer," 1989.
"Parallel Disk Array Controller," "The Rimfire 6600 Approach," "NetArray: Redundant Disk Array for NetWare™ File Servers," and "Rimfire 5500/Novell 386 Benchmarks," 1991, Ciprico, Plymouth, MN.
O'Brien, John, "RAID 7 Architecture Features Asynchronous Data Transfers," Computer Technology Review, Winter 1991.
Seminar on StorComp™ Disk Array Development Systems, Storage Computer Corporation, Nashua, NH, 1991.
"RAID Aid: A Taxonomic Extension of the Berkeley Disk Array Schema," Storage Computer Corporation, 1991.

Gamerl, M. (Fujitsu America Inc.), "The bottleneck of many applications created by serial channel disk drives is overcome with PTDs, but the price/Mbyte is high and the technology is still being refined," Hardcopy, Feb. 1987.
Johnson, C. T., "The IBM 3850: A Mass Storage System with Disk Characteristics," Proceedings of the IEEE, V63(8), Aug. 1975.
Harris, J. P., et al., "The IBM 3850 Mass Storage System: Design Aspects," Proceedings of the IEEE, V63(8), Aug. 1975.
Katz, R. H., et al., "Disk System Architectures for High Performance Computing," IEEE Log No. 8932978, IEEE Journal, Dec. 1989, pp. 1842-1858.
Miller, S. W., "A Reference Model for Mass Storage Systems Advances in Computers," Edited by Marshall Yovits, vol. 27, pp. 157-206, 1988.
"Page Fault Handling in Staging Type of Mass Storage Systems," IBM Technical Disclosure Bulletin, Oct. 1977, pp. 1710-1711.
"Controlling Error Propagation in a Mass Storage System Serving a Plurality of CPU Hosts," IBM Technical Disclosure Bulletin, May 1977, pp. 4518-4519.
Misra, P.N., "Capacity Analysis of the Mass Storage System," IBM Systems Journal, vol. 20,.No. 3, 1981.
Kronenberg, N. P., et al., "The VAXcluster Concept: An Overview of a Distributed System," Digital Technical Journal, No. 5, Sep. 1987, pp. 7-21.
Bates, K. H., "Performance Aspects of the HSC Controller," Digital Technical Journal, No. 8, Feb. 1989, pp. 25-37.
"The Hierarchical Storage Controller, A Tightly Coupled Microprocessor as Storage Server," Digital Technical Journal, No. 8, Feb. 1989, pp. 8-24.
The Cray Y-MP Computer System (Technical Feature Description), Feb. 1988.
Horowitz, P., et al., "The Art of Electronics, 2nd ed.", Cambridge University Press, 1990, pp. 712-714, 733-734.
Fisher, S. E., "RAID System Offers GUI, Flexible Drive Function", (Pacific Micro Data Inc's Mast VIII) (Brief Article), PC Week, Apr. 25, 1994, v11 n16 p. 71(1). Copyright: Ziff Davis Publishing Company 1994.
Enos, R., "Choosing a RAID Storage Solution," (included related glossary and related article on open support) (Special Report: Fault Tolerance), LAN Times, Sep. 19, 1994, v11 n19 p. 66(3). Copyright: McGraw Hill, Inc. 1994.
Patterson, D. A., et al., "Introduction to Redundant Arrays of Inexpensive Disks (RAID)," COMPCON Spring: 34th Computer Soc Intl Conf: Intellectual Leverage; San Francisco, CA; Feb./Mar. 1989; IEEE (Cat No. 89CH2686-4).
Friedman, M. B., "RAID Keeps Going and Going and . . . " IEEE Spectrum, Apr. 1996, pp. 73-79.
Moren, W. D. (Ciprico Inc), "Intelligent Controller for Disk Drives Boosts Performance of Micros," Computer Technology Review, VI (1986), Summer 1986, No. 3, Los Angeles, CA, USA, pp. 133-139.
"Method for Background Parity Update in a Redundant Array of Inexpensive Disks (RAID)," IBM Technical Disclosure Bulletin, vol. 35, No. 5, Oct. 1992, pp. 139-141.
"Host Operation Precedence with Parity Update Groupings for Raid Performance," IBM Technical Disclosure Bulletin, vol. 36, No. 03, Mar. 1993, pp. 431-433.
"Parity Preservation for Redundant Array of Independent Direct Access Storage Device Data Loss Minimization and Repair," IBM Technical Disclosure Bulletin, vol. 36, No. 03, Mar. 1993, pp. 473-478.
"LRAID: Use of Log Disks for an Efficient RAID Design," IBM Technical Disclosure Bulletin, vol. 37, No. 02A, Feb. 1994, pp. 19-20.
"Hybrid Reducdancy [sic] Direct-Access Storage Device Array with Design Options", IBM Technical Disclosure Bulletin, vol. 37, No. 02B, Feb. 1994, pp. 141-148.
"Performance Efficient Multiple Logical Unit Number Mapping for Redundant Array of Independent Disks," IBM Technical Disclosure Bulletin, vol. 39, No. 05, May 1996, pp. 273-274.
Wilkes, J., et al., "The HP AutoRAID Hierarchical Storage System", ACM Transactions on Computer Systems, Feb. 1996, vol. 14, No. 1, pp. 1-29.
Jilke, W., "Viewpoint: The Death of Large Disks?" Third Annual Computer Storage Conference, Mar. 12-13, 1987, Phoenix, Arizona.
Jilke, W., "Disk Array Mass Storage Systems: The New Opportunity," Amperif Corporation, Sep. 25, 1986.
Gibson, G.A., "Redundant Disk Arrays: Reliable, Parallel Secondary Storage," The MIT Press, Cambridge, Massachusetts (1992), pp. xvii-xxi and 1-288.
Matthews, K.C., "Implementing a Shared File System on a HIPPI Disk Array," Fourteenth IEEE Symposium on Mass Storage Systems (1995), pp. 77-88.
Katz, R. H., "High-Performance Network and Channel Based Storage," Proceedings of the IEEE, vol. 80, No. 8 (Aug. 1992), pp. 1237-1261.
"Protocols for X/Open PC Interworking: SMB, Version 2," X/Open CAE Specification (1992) pp. 121-133, 135-149 and 151-177.
Gibson, G.A., et al., "A Case for Network-Attached Secure Disks," School of Computer Science, Carnegie Mellon University (Sep. 26, 1996) pp. 1-19.
"The RAIDBook: A Source Book for RAID Technology," Edition 1-1, The RAID Advisory Board, St. Peter, MN(Nov. 18, 1993), pp. 1-110.
Drapeau, A.L., et al, "RAID-II: A High-Bandwidth Network File Server," IEEE (1994), pp. 234-244.
Copeland, G., et al., "A Comparison of High-Availability Media Recovery Techniques," Association for Computing Machinery (May 1989), pp. 98-109.
Coyne, R.A., et al., "The High Performance Storage System," Association for Computing Machinery (Apr. 1993) pp. 83-92.
Crockett, T. W., "File Concepts For Parallel I/O," Association for Computing Machinery (Aug. 1989), pp. 574-579.
Dahlin, M.D., et al., "A Quantitative Analysis of Cache Policies for Scalable Network File Systems," Association for Computing Machinery (May 1994), pp. 150-160.
Comer, D. E., et al., "Uniform Access to Internet Directory Services," Association for Computing Machinery (Aug. 1990), pp. 50-59.
Kronenberg, N.P., et al., "VAXclusters: A Closely-Coupled Distributed System," ACM Transactions on Computer Systems, vol. 4, No. 2 (May 1986), pp. 130-146.
Kim, W., "Highly Available Systems for Database Applications," Computing Surveys, vol. 16, No. 1 (Mar. 1984), pp. 71-98.
Joshi, S.P., "The Fiber Distributed Data Interface: A Bright Future Ahead," IEEE (1986), pp. 504-512.
Huber, J.V, Jr., et al., "PPFS: A High Performance Portable Parallel File System," Association for Computing Machinery (Jun. 1995), pp. 385-394.
King, R.P., et al., "Management of a Remote Backup Copy for Disaster Recovery," ACM Transactions on Database Systems, vol. 16, No. 2 (Jun. 1991), pp. 338-368.
Svobodova, L., "File Servers for Network-Based Distributed Systems," Computing Surveys, vol. 16, No. 4 (Dec. 1984), pp. 353-398.
Lantz, K.A, et al., "Towards a Universal Directory Service," Association for Computing Machinery (Sep. 1985), pp. 250-260.
Howard, J.H., et al., "Scale and Performance in a Distributed File System," ACM Transactions on Computer Systems, vol. 6, No. 1 (Feb. 1988), pp. 51-81.
Davidson, S.B., et al. "Consistency In Partitioned Networks," Computing Surveys, vol. 17, No. 3 (Sep. 1985) pp. 341-370.
Tanenbaum, A.S., et al., "Distributed Operating Systems," Computing Surveys, vol. 17, No. 4 (Dec. 1985), pp. 419-470.
Liskov, B., et al., "Replication in the Harp File System," Association for Computing Machinery (1991), pp. 226-238.
Ng, S., et al., "Trade-offs between Devices and Paths in Achieving Disk Interleaving," IEEE (Feb. 1988), pp. 196-201.
Mohan, C., "IBM's Relational DBMS Products: Features and Technologies," Association for Computing Machinery (May 1993), pp. 445-448.
Mitchell, J.G., et al., "A Comparison of Two Network-Based File Servers," Communications of the ACM, vol. 25, No. 4 (Apr. 1982), pp. 233-245.
"NonStop Transaction Services/MP," Tandem Transaction Services Product Description (1994), pp. 1-6.

Ramakrishnan, K.K., et al., "A Model of File Server Performance for a Heterogeneous Distributed System," Association of Computing Machinery (Feb. 1986), pp. 338-347.
Richards, J., et al., "A Mass Storage System for Supercomputers Based on Unix," IEEE (Sep. 1988), pp. 279-286.
Sandhu, H.S., et al., "Cluster-Based File Replication in Large-Scale Distributed Systems," 1992 ACM Sigmetrics & Performance Evaluation Review, vol. 20, No. 1 (Jun. 1992), pp. 91-102.
Polyzois, C.A., et al., "Evaluation of Remote Backup Algorithms for Transaction-Processing Systems," ACM Transactions on Database Systems, vol. 19, No. 3 (Sep. 1994), pp. 423-449.
Weinstein, M.J., et al., "Transactions and Synchronization in a Distributed Operating System," Association of Computing Machinery (Dec. 1985), pp. 115-126.
Walker, B., et al., "The LOCUS Distributed Operating System," Association of Computing Machinery (Jun. 1983), pp. 49-70.
Hartman, J.H., et al., "The Zebra Striped Network File System," ACM Transactions on Computer Systems, vol. 13, No. 3 (Aug. 1995), pp. 274-310.
Levy, E., et al., "Distributed File Systems: Concepts and Examples," ACM Computing Surveys, vol. 22, No. 4 (Dec. 1990), pp. 321-374.
"NCSA's Upgrade Strategy," Access (Fall 1994), pp. 1-3.
Chandra, A., "Connection Machines," Thinking Machines Corporation (May 16, 1996).
Chen, P.M., et al., "A New Approach to I/O Performance Evaluation—Self-Scaling I/O Benchmarks, Predicted I/O Performance," ACM Transactions on Computer Systems, vol. 12, No. 4 (Nov. 1994), pp. 308-339.
"Foreground/Background Checking of Parity in a Redundant Array of Independent Disks-5 Storage Subsystem," IBM Technical Disclosure Bulletin, vol. 38, No. 7 (Jul. 1995), pp. 455-458.
"Limited Distributed DASD Checksum, a RAID Hybrid," IBM Technical Disclosure Bulletin, No. 4a (Sep. 1992), pp. 404-405.
"Direct Memory Access Controller for DASD Array Controller," IBM Technical Disclosure Bulletin, vol. 37, No. 12 (Dec. 1994), pp. 93-98.
"Parity Read-Ahead Buffer for Raid System," IBM Technical Disclosure Bulletin, vol. 38, No. 9 (Sep. 1995), pp. 497-500.
"Continuous Data Stream Read Mode for DASD Arrays," IBM Technical Disclosure Bulletin, vol. 38, No. 6 (Jun. 1995), pp. 303-304.
"Multibus Synchronization for Raid-3 Data Distribution," IBM Technical Disclosure Bulletin, No. 5 (Oct. 1992), pp. 21-24.
"Direct Data Coupling," IBM Technical Disclosure Bulletin (Aug. 1976), pp. 873-874.
"Redundant Arrays of Independent Disks Implementation in Library within a Library to Enhance Performance," IBM Technical Disclosure Bulletin, vol. 38, No. 10 (Oct. 1995), pp. 351-354.
"Design for a Backing Storage for Storage Protection Data," IBM Technical Disclosure Bulletin, No. 1 (Jun. 1991), pp. 34-36.
"Data Volatility Solution for Direct Access Storage Device Fast Write Commands," IBM Technical Disclosure Bulletin, No. 12 (May 1991), pp. 337-342.
"Efficient Storage Management for a Temporal Performance Database," IBM Technical Disclosure Bulletin, No. 2 (Jul. 1992), pp. 357-361.
"On-Demand Code Replication in a Firmly Coupled Microprocessor Environment," IBM Technical Disclosure Bulletin, vol. 38, No. 11 (Nov. 1995), pp. 141-144.
"Bounding Journal Back-Off during Recovery of Data Base Replica in Fault-Tolerant Clusters," IBM Technical Disclosure Bulletin, vol. 36, No. 11 (Nov. 1993), pp. 675-678.
"High-Speed Track Format Switching for Zoned Bit Recording," IBM Technical Disclosure Bulletin, vol. 36, No. 11 (Nov. 1993), pp. 669-674.
"Technique for Replicating Distributed Directory Information," IBM Technical Disclosure Bulletin, No. 12 (May 1991), pp. 113-120.
"Fault Tolerance through Replication of Video Assets," IBM Technical Disclosure Bulletin, vol. 39, No. 9 (Sep. 1996), pp. 39-42.
"Dual Striping for Replicated Data Disk Array," IBM Technical Disclosure Bulletin, No. 345 (Jan. 1993).
"Replication and Recovery of Database State Information in Fault Tolerant Clusters," IBM Technical Disclosure Bulletin, vol. 36, No. 10 (Oct. 1993), pp. 541-544.
"Threshold Scheduling Policy for Mirrored Disks," IBM Technical Disclosure Bulletin, No. 7 (Dec. 1990), pp. 214-215.
"Method for Consistent Data Replication for Collection Management in a Dynamic Partially Connected Collection," IBM Technical Disclosure Bulletin, No. 5 (Oct. 1990), pp. 454-464.
"Grouping Cached Data Blocks for Replacement Purposes," IBM Technical Disclosure Bulletin (Apr. 1986), pp. 4947-4949.
"Zero-Fetch Cycle Branch," IBM Technical Disclosure Bulletin (Aug. 1986), pp. 1265-1270.
"Cache Enhancement for Store Multiple Instruction," IBM Technical Disclosure Bulletin (Dec. 1984), pp. 3943-3944.
"Dynamic Address Allocation in a Local Area Network," IBM Technical Disclosure Bulletin (May 1983), pp. 6343-6345.
"Multi Disk Replicator Generator Design," IBM Technical Disclosure Bulletin (Mar. 1981), pp. 4683-4684.
"Continuous Read and Write of Multiple Records by Start Stop Buffers between Major and Minor Loops," IBM Technical Disclosure Bulletin (Dec. 1980), pp. 3450-3452.
"Read Replicated Data Feature to the Locate Channel Command Word," IBM Technical Disclosure Bulletin (Jan. 1980), p. 3811.
"Rapid Access Method for Fixed Block DASD Records," IBM Technical Disclosure Bulletin (Sep. 1977), pp. 1565-1566.
"Multimedia Audio on Demand," IBM Technical Disclosure Bulletin, vol. 37, No. 6B (Jun. 1994), pp. 451-460.
"Asynchronous Queued I/O Processor Architecture," IBM Technical Disclosure Bulletin, No. 1 (Jan. 1993), pp. 265-278.
"Service Processor Data Transfer," IBM Technical Disclosure Bulletin, No. 11 (Apr. 1991), pp. 429-434.
"Hardware Address Relocation for Variable Length Segments," IBM Technical Disclosure Bulletin (Apr. 1981), pp. 5186-5187.
"Swap Storage Management," IBM Technical Disclosure Bulletin (Feb. 1978), pp. 3651-3657.
"Interface Control Block for a Storage Subsystem," IBM Technical Disclosure Bulletin (Apr. 1975), pp. 3238-3240.
"Automated Storage Management," IBM Technical Disclosure Bulletin (Feb. 1975), pp. 2542-2543.
"Takeover Scheme for Control of Shared Disks," IBM Technical Disclosure Bulletin (Jul. 1989), pp. 378-380.
"General Adapter Architecture Applied to an ESDI File Controller," IBM Technical Disclosure Bulletin (Jun. 1989), pp. 21-25.
"Multiple Memory Accesses in a Multi Microprocessor System," IBM Technical Disclosure Bulletin (Nov. 1981), pp. 2752-2753.
"Control Interface for Magnetic Disk Drive," IBM Technical Disclosure Bulletin (Apr. 1980), pp. 5033-5035.
"System Organization of a Data Transmission Exchange," IBM Technical Disclosure Bulletin (Feb. 1963), pp. 35-38.
"Service Processor Architecture and Microcode Algorithm for Performing Protocol Conversions Start/Stop, BSC, SDLC," IBM Technical Disclosure Bulletin (May 1989), pp. 461-464.
"Shared Storage Bus Circuitry," IBM Technical Disclosure Bulletin (Sep. 1982), pp. 2223-2224.
"Dynamically Alterable Data Transfer Mechanism for Direct Access Storage Device to Achieve Optimal System Performance," IBM Technical Disclosure Bulletin (Jun. 1978), pp. 39-39.
"Multi-Level DASD Array Storage System," IBM Technical Disclosure Bulletin, vol. 38, No. 6 (Jun. 1995), pp. 23-24.
"Redundant Array of Independent Disks 5 Parity Cache Strategies," IBM Technical Disclosure Bulletin, vol. 37, No. 12 (Dec. 1994), pp. 261-264.
"Method for Data Transfer for Raid Subsystem," IBM Technical Disclosure Bulletin, vol. 39, No. 8 (Aug. 1996), pp. 99-100.
Stodolsky, D., et al., "Parity Logging Overcoming the Small Write Problem in Redundant Disk Arrays," 20$^{th}$ Annual International Symposium on Computer Architecture (May 16-19, 1993), pp. 1-12.
Mogi, K., et al., "Hot Block Clustering for Disk Arrays with Dynamic Striping," Proceedings of the 21$^{st}$ VLDB Conference, Zurich, Switzerland (1995), pp. 90-99.
Dahlin, M.D., et al. "Cooperative Caching: Using Remote Client Memory to Improve File System Performance," First Symposium on Operating Systems Design and Implementation (OSDI) (Nov. 14-17, 1994), pp. 267-279.

Wood, D.A., et al., "An In-Cache Address Translation Mechanism," The 13th Annual International Symposium on Computer Architecture, Tokyo, Japan (Jun. 25, 1986), pp. 358-365.
Corbett, P.F., et al., "Overview of the Vesta Parallel File System," Computer Architecture News, vol. 21, No. 5 (Dec. 1993), pp. 7-14.
Patterson, D.A. "Massive Parallelism and Massive Storage: Trends and Predictions for 1995 to 2000," Keynote Address, Second International Conference on Parallel and Distributed Information Systems, San Diego California (Jan. 1993), pp. 6-7.
Uiterwijk, A., "RAID Storage System; Superflex 3000 Provides Dynamic Growth," *InfoWorld* (Jun. 17, 1996), p. N/13.
Francis, B., "SuperFlex Unveiled for RAID Market," *InfoWorld* (Sep. 11, 1995), p. 38.
Levine, R., "Know Your RAID? You've Got it Made: The explosion in Network Storage Needs is Driving Business to VARs who Understand RAID Technology," *VARBusiness* (Jan. 1, 1996).
"AMI Introduces RAID Technology Disk Array," *Worldwide Computer Product News* (Mar. 1, 1996).
"American Megatrends Inc. has Introduced FIexRAID, a New Adaptive RAID Technology," *TelecomWorldWire* (Feb. 23, 1996).
"ABL Canada's VT2C Demonstrates Unparalleled Flexibility in a Major Application for the U.S. Government BTG Selected for Billion Dollar ITOP Program," *Business Wire* (May 24, 1996).
"American Megatrends' FIexRAID Advances RAID Technology to the Next Level; Adaptive RAID Combines Significant Firmware and Software Features," *PR Newswire* (Feb. 22, 1996).
"American Megatrends' General Alert Software Maximizes Fault Tolerance; Watchdog Utility Significantly Reduces Reaction Time," *PR Newswire* (Feb. 16, 1996).
"American Megatrends Capitalizes on World Wide Web Presence; AMI Site Open for Business with New Look and On-Line Purchase Options," *PR Newswire* (Jan. 9, 1996).
"AMI Offers Detailed Support for SAF-TE RAID Standard; New Standard Will Reduce Error Reaction Time and Increase RAID System Safety," *PR Newswire* (Oct. 30, 1995).
"American Megatrends and Core International Jointly Develop RAIDStack(TM) Intelligent RAID Controller Board; Combination of AMI MegaRAID (TM) Hardware With Core Technology to Revolutionize RAID Market," *PR Newswire* (Oct. 26, 1995).
"AMI Announces New MegaRAID Ultra RAID Controller; New SCSI PCI RAID Controller Breaks Speed and Technology Barriers," *PR Newswire* (Oct. 3, 1995).
Crothers, B., "Controller Cards; AMI to Unveil DMI-Compliant RAID Controller," *InfoWorld* (Oct. 9, 1995).
"American Megatrends Joins RAID Advisory Board," *PR Newswire* (Sep. 20, 1995).
Crothers, B., "AMI Moves into RAID Market with New Controller Design," *InfoWorld* (Jul. 17, 1995).
Gold, S., "HP's Smart Auto-RAID Backup Technology," Newsbytes News Network (Aug. 4, 1995), pp. 1-2.
Savage, S., et al., "AFRAID—A Frequently Redundant Array of Independent Disks," Usenix Technical Conference (Jan. 22-26, 1996), pp. 27-39.
"Departmental Networks; 1996 Buyers Guide; Buyers Guide" *LAN Magazine* (Sep. 15, 1996).
"Miniguide: RAID Products," *Optical Memory News* (Jul. 16, 1996).
Whipple, D., "EMC Leaps ahead in Market for Mainframe Storage," *Business Dateline: Boulder County Business Report* (Jun. 1996).
Burden, K., et al., "RAID Stacks up; The Varied Approach of Ramac, Symmetrix and Iceberg Score Well with Diverse Users," *Computerworld* (Feb. 26, 1996).
"EMC's RAID-S Attains an Industry First with RAID Advisory Board Conformance; Unique RAID-S Implementation is First Mainframe/Open Systems Feature to Receive RAID Level 5 Conformance Certification," *Business Wire* (Dec. 11, 1995).
Babcock, C., "RAID Invade New Turf," *Computerworld* (Jun. 19, 1995), p. 186.
Enticknap, N., "Storing Up Trouble; IBM's Problems in the Disc Array Market," *ASAP* (May 11, 1995), p. 40.
"EMC Brings Top Performance to Mainframe Customers with Smaller Capacity Needs," *Business Wire* (Apr. 17, 1995).
Stedman, C., et al., "Discount Days to End for EMC Customers," *Computerworld* (Apr. 17, 1995), p. 4.
Lapolla, S., "DEC Broadens Storage Support; Scalable Storageworks Taps Multiplatform Server Data; DEC Storageworks RAID Array 410 RAID Array System; Brief Article; Product Announcement," *ASAP*, No. 6, vol. 12 (Feb. 13, 1995), p. 50.
Stedman, C., et al., "EMC Recasts RAID," *Computerworld* (Jan. 30, 1995), p. 1.
Callery, R., "Buying Issues Turned Upside Down; In The RAID World, Products Are Built to Fit the Data. In The Past, IBM Offered One-Size DASD for all Needs," *Computerworld* (Jan. 30, 1995), p. 78.
"Making Up Lost Ground; New Redundant Arrays of Independent Disks Offerings from IBM; Includes Related Articles on Storage Companies, Approaches to RAID and IBM Storage Product Plans; Special Report: Storage," *ASAP*, vol. 15; No. 7 (Jul. 1994), p. S13.
Stedman, C., "New IBM Arrays Fall Short of Rival EMCs Performacne [sic]," *Computerworld* (Jun. 13, 1994), p. 6.
Ambrosio, J., "IBM to Unveil First Host RAID Device," *Computerworld* (Nov. 22, 1993), p. 1.
Nash, K., "EMC Ups Mainframe Storage Ante," *Computerworld* (Nov. 16, 1992), p. 8.
Sullivan-Trainor, M., et al., "Smaller, Faster, but not Cheaper; EMC's Symmetrix Storage Systems Beat IBM's Conventional DASD in Key Areas Expcept [sic] Cost and Ease of Customizing," *Computerworld* (Jun. 15, 1992), p. 72.
Sterlicchi, J., "US: Outlook; Column" *ASAP* (Feb. 13, 1992) p. 22.
Gillin, P., "EMC Upgrades 3990-like Disk Array by 60%," *Computerworld* (Jan. 13, 1992), p. 160.
"EMC Brings Revolutionary Disk Array Storage System to Unisys 1100/2200 Market," *Business Wire* (Sep. 9, 1991).
Casey, M., "In Real Life," *Computerworld* (Aug. 19, 1991), p. 550.
Moran, R., "Preparing for a RAID—What Are the Benefits of Redundant Arrays of Inexpensive Disks?," *Information Week* (May 27, 1991), p. 280.
"EMC Sees Exceptional Customer Demand for Symmetrix Product Line; Mar. 15 Price Increase Planned," *Business Wire* (Feb. 13, 1991).
Teresko, J., et al.(ed.), "Next Generation in Data Storage," *Industry Week* (Oct. 15, 1990), p. 680.
"Two Years Ahead of Its Competitors' Projected Delivery Dates, EMC Unveils First 'RAID' Computer Storage System," *Business Wire* (Sep. 25, 1990).
"Best System Corp. purchases Encore Infinity R/T for 3D Virtual Realty [sic] in Motion Simulation Rides," *Business Wire* (Sep. 17, 1996).
"Encore Expands Into New Gaming Market with Best System Inc. and Pacific System Integrators Inc.," *Business Wire* (Sep. 10, 1996).
"Encore Computer Corporation: South African Farm Cooperative Buys Encore Infinity Data Storage System," *M2 Presswire* (Sep. 9, 1996).
"Memorex Telex Sells Encore Infinity SP to Haindl," *Business Wire* (Sep. 3, 1996).
"Encore Sells Data Sharing Infinity Storage System to Farm Cooperative in South Africa," *Business Wire* (Aug. 20, 1996).
"Encore Reports Second Quarter Financial Results; Product Revenues Increase—Service Declines," *Business Wire* (Aug. 19, 1996).
"Encore Computer Corp. Sells Infinity SP30 to 10th Largest Software Company in Germany," *Business Wire* (Jul. 11, 1996).
"Encore Sells Real-Time Systems to the French Navy, DCN-Direction Des Constructions Navales $1 Million Contract," *Business Wire* (Jul. 9, 1996).
"Gulf States Toyota, Inc. purchases Encore's Infinity SP Storage Processor with Data Sharing and Backup/Restore Capabilities," *Business Wire* (Jun. 25, 1996).
"Encore Awarded a $3 million Contract for Real-Time Computer Systems from EDF Nuclear Power in France," *Business Wire* (Jun. 25, 1996).
"Pepsi-Cola General Bottlers Takes Advantage of Data Sharing Capability of Encore's Infinity SP30," *Business Wire* (Jun. 11, 1996).
"Memorex Telex (UK) Ltd. to Sell Encore Infinity SP Storage Processors," *Business Wire* (Jun. 3, 1996).
"Amcotec Sells Encore Infinity SP30 to General Accident South Africa," *Business Wire* (May 28, 1996).

"Encore Gets $3 Million Order for London Underground; Safety Criteria Impose Special Requirements," *Business Wire* (May 21, 1996).
"Encore Reports First Quarter Financial Results; Records Initial Storage Product Revenue," *Business Wire* (May 15, 1996).
"KPT Inc. Purchases Encore Infinity SP30 Storage Processor for Print Server Applications," *Business Wire* (May 14, 1996).
McHugh, J. "When It Will Be Smart to be Dumb," *Forbes* (May 6, 1996).
"Sikorsky Purchases Encore Computer Systems for Helicopter Simulation," *Business Wire* (Apr. 22, 1996).
"Encore Reports Year End Financial Results . . . $100M Financing Completed," *Business Wire* (Apil 16, 1996).
"Digital and Encore Computer to Market Infinity Gateway for AlphaServer 8000 Systems," *Business Wire* (Apr. 10, 1996).
"Encore Gets Contract," *Sun-Sentinel* (Mar. 26, 1996), p. 3D.
"Northrop Grumman Purchases Encore Systems for U.S. and French Navy E-2C Project," *Business Wire* (Mar. 25,1996).
"Encore Announces a Simple, Low Cost, Direct Internet Data Facility to Share Mainframe and Open Systems Data," *Business Wire* (Feb. 29, 1996).
"Encore Sells Infinity SP30 Storage System; ISC of Miami Realizes Operating Efficiencies and Financial Savings from New Storage System," *Business Wire* (Feb. 20, 1996).
"Encore Sells Infinity SP30 Storage System to GUVV in Germany," *Business Wire* (Feb. 9, 1996).
"Encore Signs Memorex Telex Italia; Italian Distributor to Market the Infinity SP Storage Processor," *Business Wire* (Feb. 6, 1996).
"Encore Wins Award Valued at Over $1M for PAC-3 Missile," *Business Wire* (Jan. 29, 1996).
"Encore Wins Contract Valued at US$500,000 from Ceselsa," *M2 Presswire* (Jan. 25, 1996).
"Encore Wins Award Valued at $500 Thousand from Ceselsa," *Business Wire* (Jan. 23, 1996).
"Encore Announces World's Fastest Single Board Computer System," *Business Wire* (Jan. 10, 1996).
"Encore Announces Infinity R/T Sale to ENEL in Italy," *Business Wire* (Dec. 18, 1995).
"Encore Extends Storage Presence to Argentina," *M2 Presswire* (Dec. 12, 1995).
"Encore Extends Storage Presence to Argentina; Panam Tech to Sell Infinity SP Storage Processors," *Business Wire* (Dec. 11, 1995).
"Encore Announces Sale to Agusta Sistemi in Italy; Alpha AXP-Based Infinity R/T Selected for Simulation," *Business Wire* (Dec. 4, 1995).
"Encore Announces System Sale to Letov in Czech Republic," *Business Wire* (Nov. 27, 1995).
"Encore Ships Computer System for High Speed Magnetic Suspension Train," *Business Wire* (Nov. 25, 1995).
"Encore Reports Third Quarter Financial Results; Encore Makes Progress in Building Storage Distribution," *Business Wire* (Nov. 20, 1995).
Depompa, B. "EMC Device Does Two Jobs-New Enterprise Storage Platform Can Handle Data from Mainframes and Unix Computer Systems," *Information Week* (Nov. 20, 1995), p. 163.
"Encore Signs Major Distributor in Sweden; MOREX to Sell Infinity SP Storage Family," *Business Wire* (Nov. 13, 1995).
Stedman, C., "EMC to Open Up Disk Arrays; Symmetrix 5000 Will Store Data From Multiple Platforms," *Computerworld* (Nov. 6, 1995), p. 14.
"Encore Ships Systems to AeroSimulation; Contract Valued at $1 Million Plus," *Business Wire* (Oct. 31, 1995).
"Encore Wins Award from Lockheed Martin; $2.4 Million Contract Awarded for MTSS Program," *Business Wire* (Oct. 24, 1995).
"Encore Sets Agreement with Bell Atlantic Business Systems Services for Storage Systems," *Business Wire* (Oct. 16, 1995).
"Encore Accelerates Paradigm Shift; Intelligent Storage Controllers Outfeature and Outperform All Fixed Function DASD Controllers," *Business Wire* (Oct. 9, 1995).
"Encore Infinity SP40 Sets Industry Standard Performance Record for DASD Controllers," *Business Wire* (Oct. 9, 1995).
"News Shorts," *Computerworld* (Oct. 9, 1995), p. 8.
"Encore Announces Entry Level Storage System That Revolutionizes Enterprise Wide Data Access; Provides Open Systems Users Direct Access to Mainframe Data," *Business Wire* (Sep. 19, 1995).
Cao, P., et al., "The TickerTAIP Parallel RAID Architecture," HP Laboratories Technical Report (Nov. 1992), pp. 1-20.
Berson, S., et al., "Fault Tolerant Design of Multimedia Servers," SIGMOD (1995).
Chen, P.M., et al., "RAID: High-Performance, Reliable Secondary Storage," ACM Computing Surveys, vol. 26, No. 2 (Jun. 1994), pp. 145-185.
Staelin, C., et al., "Clustering Active Disk Data to Improve Disk Performance," Department of Computer Science (Sep. 20, 1990), pp. 1-25.
Seltzer, M., et al., "An Implementation of a Log-Structured File System for UNIX," 1993 Winter USENIX (Jan. 25-29, 1993), pp. 1-18.
Kohl, J.T., et al., "HighLight: Using a Log-Structured File System for Tertiary Storage Management," (Nov. 20, 1992), pp. 1-15.
Berson, S., et al., "Staggered Striping in Multimedia Information Systems," Computer Science Department Technical Report, University of California (Dec. 1993), pp. 1-24.
Polyzois, C.A., et al., "Disk Mirroring with Alternating Deferred Updates," Proceedings of the 19$^{th}$ VLDB Conference, Dublin, Ireland (1993), pp. 604-617.
Stodolsky, D., et al., "Parity Logging: Overcoming the Small Write Problem in Redundant Disk Arrays," 20$^{th}$ Annual International Symposium on Computer Architecture (May 16-19, 1993), pp. 1-12.
Holland, M., et al. "Parity Declustering for Continuous Operation in Redundant Disk Arrays," Proceedings of the 5$^{th}$ Conference on Architectural Support for Programming Languages and Operating Systems (1992).
Gray, J., et al., "Parity Striping of Disc Arrays: Low-Cost Reliable Storage with Acceptable Throughput," Proceedings of the 16$^{th}$ VLDB Conference, Brisbane, Australia (1990), pp. 148-161.
Hartman, J. H. "The Zebra Striped Network File System," Dissertation, University of California At Berkeley (1994), pp. i-ix and 1-147.
"Data Link Provider Interface Specification," OSI Work Group, UNIX International (Aug. 20, 1991), pp. 1-174 and clxxv-vii.
"Veritas® Volume Manager (VxVM®): User's Guide, Release 2.3," Solaris™ (Aug. 1996).
"IEEE Standard Dictionary of Measures to Produce Reliable Software," The Institute of Electrical and Electronics Engineers, Inc., New York, NY (Apr. 30, 1989), pp. 1-37.
"IEEE Standard for Software User Documentation," The Institute of Electrical and Electronics Engineers, Inc., New York, NY (Aug. 22, 1988), pp. 1-16.
"IEEE Standard for Software Unit Testing," The Institute of Electrical and Electronics Engineers, Inc., New York, NY (Dec. 29, 1986), pp. 1-24.
"IEEE Guide for Software Quality Assurance Planning," The Institute of Electrical and Electronics Engineers, Inc., New York, NY (Feb. 1986), pp. 1-31.
"Fourteenth IEEE Symposium on Mass Storage Systems: Storage-at the Forefront of Information Infrastructures," Second International Symposium, Monterey, California (Kavanaugh, Mary E. (ed.)) (Sep. 11-14, 1995), pp. v-xi and 1-369.
"IEEE Guide to Software Design Descriptions," The Institute of Electrical and Electronics Engineers, Inc., New York, NY (May 25, 1993), pp. i-v and 1-22.
"IEEE Guide for the Use of IEEE Standard Dictionary of Measures to Produce Reliable Software," Institute of Electrical and Electronics Engineers, Inc., New York (Jun. 12, 1989), pp. 1-96.
"IEEE Guide to Software Configuration Management," The Institute of Electrical and Electronics Engineers, Inc., New York (Sep. 12, 1988), pp. 1-92.
"IEEE Standard for Software Quality Assurance Plans," Institute of Electrical and Electronics Engineers, Inc., New York, NY (Aug. 17, 1989), pp. 1-12.
"IEEE Standard for Software Test Documentation," The Institute of Electrical and Electronics Engineers, Inc., New York, NY (Dec. 3, 1982), pp. 1-48.

Coleman, S. and Miller, S. (eds.), "Mass Storage System Reference Model, Version 4," IEEE Technical Committee on Mass Storage Systems and Technology (May 1990), pp. 1-38.
Wilkes, J., et al., "Introduction to the Storage Systems Program," Computer Systems Laboratory, Hewlett Packard Laboratories (Aug. 10, 1995), pp. 1-37.
IEEE Storage Systems Standards Working Group (Project 1244), "Reference Model for Open Storage Systems Interconnection: Mass Storage Systems Reference Model, Version 5," The Institute of Electrical and Electronics Engineers, Inc., New York, NY (Sep. 8, 1994).
Bedoll, R. F., "Mass Storage Support for Supercomputing," IEEE (Sep. 1988), pp. 217-221.
Bhide, A., et al., "An Efficient Scheme for Providing High Availability," Association for Computing Machinery SIGMOD (Apr. 1992), pp. 236-245.
Borgerson, B.R., et al., "The Architecture of the Sperry UNIVAC 1100 Series Systems," IEEE (Jun. 1979), pp. 137-146.
Bard, Y., "A Model of Shared DASD and Multipathing," Communications of the ACM, vol. 23, No. 10 (Oct. 1980), pp. 564-572.
Cheriton, D. R., UIO: A Uniform I/O System Interface for Distributed Systems, ACM Transactions on Computer Systems, vol. 5, No. 1 (Feb. 1987) pp. 12-46.
Fisher, Susan E., RAID System Offers GUI, Flexible Drive Function. (Pacific Micro Data Inc's Mast VIII) (Brief Article), *PC Week*, Apr. 25, 1994 v11 n16 p 71 (1), Copyright: Ziff Davis Publishing Company 1994.
Enos, Randy, Choosing a RAID Storage Solution. (included related glossary and related article on open support) (Special Report: Fault Tolerance), *LAN Times*, Sep. 19, 1994 v11 n19 p66 (3) Copyright: McGraw Hill, Inc. 1994.
David A. Patterson, Peter Chen, Garth Gibson, and Randy H. Katz, Introduction to Redundancy Arrays of Inexpensive Disks (RAID), Computer Science Division, Department of Electrical Engineering and Computer Sciences, University of California, CH2686-4/89/0000/0112$01.00 © 1989 IEEE.
Mark B. Friedman, RAID Keeps Going and Going and . . . *IEEE Spectrum,* Apr. 1996.

* cited by examiner

AUTOMATIC EJECTION FLOW DIAGRAM

VERTICAL AND HORIZONTAL POWER SHARING METHOD
BOTH METHODS ARE USED

HORIZONTAL

-ON EACH RACK THE POWER SUPPLY IS IN A N+1 PROTECTED CONFIGURATION

VERTICAL (UNIQUE METHOD)

-POWER SUPPLIES ARE SHARED AND PROTECTED VERTICALLY BY ANOTHER RACK

-COULD BE CONFIGURED AS A N+1, N+1+1 OR N+R WHERE R IS THE # OF RANKS

UNIVERSAL STORAGE MANAGEMENT SYSTEM

Matter enclosed in heavy brackets [ ] appears in the original patent but forms no part of this reissue specification; matter printed in italics indicates the additions made by reissue.

PRIORITY

*This is a reissue application of U.S. Pat. No. 6,098,128 that issued on Aug. 1, 2000.* A claim of priority is made to U.S. Provisional Patent Application Ser. No. 60/003,920 entitled UNIVERSAL STORAGE MANAGEMENT SYSTEM, filed Sep. 18 1995.

FIELD OF THE INVENTION

The present invention is generally related to data storage systems, and more particularly to cross-platform data storage systems and RAID systems.

BACKGROUND OF THE INVENTION

One problem facing the computer industry is lack of standardization in file subsystems. This problem is exacerbated by I/O addressing limitations in existing operating systems and the growing number of non-standard storage devices. A computer and software application can sometimes be modified to communicate with normally incompatible storage devices. However, in most cases such communication can only be achieved in a manner which adversely affects I/O throughput, and thus compromises performance. As a result, many computers in use today are "I/O bound." More particularly, the processing capability of the computer is faster than the I/O response of the computer, and performance is thereby limited. A solution to the standardization problem would thus be of interest to both the computer industry and computer users.

In theory it would be possible to standardize operating systems, file subsystems, communications and other systems to resolve the problem. However, such a solution is hardly feasible for reasons of practicality. Computer users often exhibit strong allegiance to particular operating systems and architectures for reasons having to do with what the individual user requires from the computer and what the user is accustomed to working with. Further, those who design operating systems and associated computer and network architectures show little propensity toward cooperation and standardization with competitors. As a result, performance and ease of use suffer.

SUMMARY OF THE INVENTION

Disclosed is a universal storage management system which facilitates storage of data from a client computer. The storage management system functions as an interface between the client computer and at least one storage device and facilitates reading and writing of data by handling I/O operations. More particularly, I/O operation overhead in the client computer is reduced by translating I/O commands from the client computer to high level I/O commands which are employed by the storage management system to carry out I/O operations. The storage management system also enables interconnection of a normally incompatible storage device and client computer by translating I/O requests into an intermediate common format which is employed to generate commands which are compatible with the storage device receiving the request. Files, error messages and other information from the storage device are similarly translated and provided to the client computer.

The universal storage management system provides improved performance since client computers attached thereto are not burdened with directly controlling I/O operations. Software applications in the client computers generate I/O commands which are translated into high level commands which are sent by each client computer to the storage system, The storage management system controls I/O operations for each client computer based on the high level commands. Overall network throughput is improved since the client computers are relieved of the burden of processing slow I/O requests.

The universal storage management system can provide a variety of storage options which are normally unavailable to the client computer. The storage management system is preferably capable of controlling multiple types of storage devices such as disk drives, tape drives, CD-ROMS, magneto optical drives etc., and making those storage devices available to all of the client computers connected to the storage management system. Further, the storage management system can determine which particular storage media any given unit of data should be stored upon or retrieved from. Each client computer connected to the storage system thus gains data storage options because operating system limitations and restrictions on storage capacity are removed along with limitations associated with support of separate storage media. For example, the universal storage management system can read information from a CD-ROM and then pass that information on to a particular client computer, even though the operating system of that particular client computer has no support for or direct connection to the CD-ROM.

By providing a common interface between a plurality of client computers and a plurality of shared storage devices, network updating overhead is reduced. More particularly, the storage management system allows addition of drives to a computer network without reconfiguration of the individual client computers in the network. The storage management system thus saves installation time and removes limitations associated with various network operating systems to which the storage management system may be connected.

The universal storage management system reduces wasteful duplicative storage of data. Since the storage management system interfaces incompatible client computers and storage devices, the storage management system can share files across multiple heterogeneous platforms. Such file sharing can be employed to reduce the overall amount of data stored in a network. For example, a single copy of a given database can be shared by several incompatible computers, where multiple database copies were previously required. Thus, in addition to reducing total storage media requirements, data maintenance is facilitated.

The universal storage management system also provides improved protection of data. The storage management system isolates regular backups from user intervention, thereby addressing problems associated with forgetful or recalcitrant employees who fail to execute backups regularly.

BRIEF DESCRIPTION OF THE DRAWING

These and other features of the present invention will become apparent in light of the following detailed description thereof, in which.

DETAILED DESCRIPTION OF THE INVENTION

Figure 1:
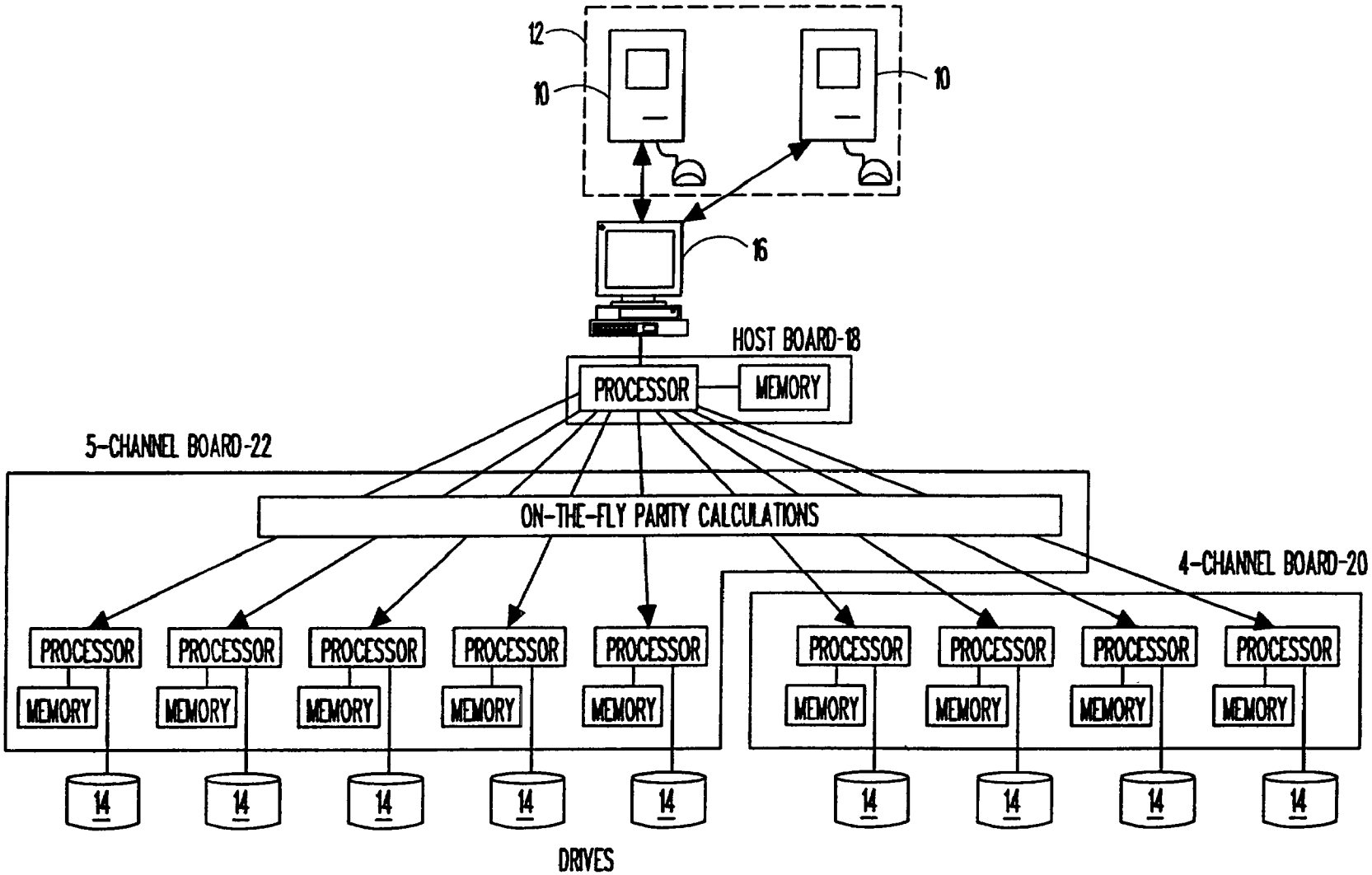
FIG. 1 is a block diagram which illustrates the storage management system in a host computer.
Figure 1A:
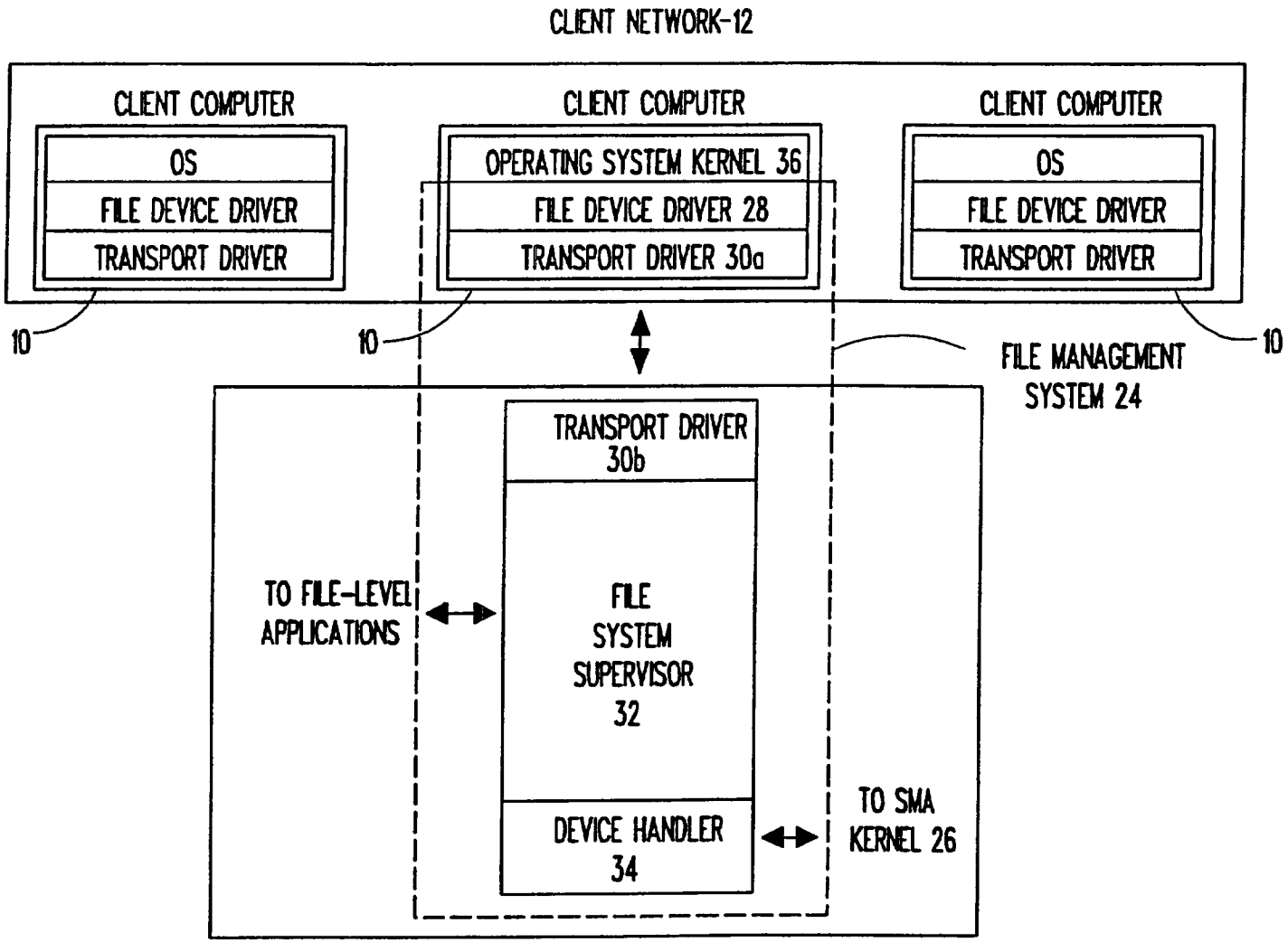
FIG. 1a is a block diagram of the file management system.

Referring to FIGS. 1 and 1a, the universal storage management system includes electronic hardware and software which together provide a cross platform interface between at least one client computer 10 in a client network 12 and at least one storage device 14. The universal storage management system is implemented in a host computer 16 and can include a host board 18, a four channel board 20, a five channel board 22 for controlling the storage devices 14. It should be noted, however, that the software could be implemented on standard hardware. The system is optimized to handle I/O requests from the client computer and provide universal storage support with any of a variety of client computers and storage devices. I/O commands from the client computer are translated into high level commands, which in turn are employed to control the storage devices.

Referring to FIGS. 1, 1a, 2 & 2a, the software portion of the universal storage management system includes a file management system 24 and a storage management architecture ("SMA") kernel 26. The file management system manages the conversion and movement of files between the client computer 10 and the SMA Kernel 26. The SMA kernel manages the flow of data and commands between the client computer, device level applications and actual physical devices.

The file management system includes four modules: a file device driver 28, a transport driver 30a, 30b, a file system supervisor 32, and a device handler 34. The file device driver provides an interface between the client operating system 36 and the transport driver. More particularly, the file device driver resides in the client computer and redirects files to the transport driver. Interfacing functions performed by the file device driver include receiving data and commands from the client operating system, converting the data and commands to a universal storage management system file format, and adding record options, such as lock, read-only and script.

The transport driver 30a, 30b facilitates transfer of files and other information between the file device driver 28 and the file system supervisor 32. The transport driver is specifically configured for the link between the client computers and the storage management system. Some possible links include: SCSI-2, SCSI-3, fiber link, 802.3, 802.5, synchronous and a synchronous RS232, wireless RF, and wireless IR. The transport driver includes two components: a first component 30a which resides in the client computer and a second component 30b which resides in the storage management system computer. The first component receives data and commands from the file device driver. The second component relays data and commands to the file system supervisor. Files, data, commands and error messages can be relayed from the file system supervisor to the client computer operating system through the transport driver and file device driver.

The file system supervisor 32 operates to determine appropriate file-level applications for receipt of the files received from the client computer 10. The file system supervisor implements file specific routines on a common format file system. Calls made to the file system supervisor are high level, such as Open, Close, Read, Write, Lock, and Copy. The file system supervisor also determines where files should be stored, including determining on what type of storage media the files should be stored. The file system supervisor also breaks each file down into blocks and then passes those blocks to the device handler. Similarly, the file system supervisor can receive data from the device handler.

The device handler 34 provides an interface between the file system supervisor 32 and the SMA kernel 26 to provide storage device selection for each operation. A plurality of device handlers are employed to accommodate a plurality of storage devices. More particularly, each device handler is a driver which is used by the file system supervisor to control a particular storage device, and allow the file system supervisor to select the type of storage device to be used for a specific operation. The device handlers reside between the file system supervisor and the SMA kernel and the storage devices. The device handler thus isolates the file system supervisor from the storage devices such that the file system supervisor configuration is not dependent upon the configuration of the specific storage devices employed in the system.

The SMA Kernel 26 includes three independent modules: a front end interface 36, a scheduler 38, and a back-end interface 40. The front end interface is in communication with the client network and the scheduler. The scheduler is in communication with the back-end interface, device level applications, redundant array of independent disks ("RAID") applications and the file management system. The back-end interface is in communication with various storage devices.

The front-end interface 36 handles communication between the client network 12 and resource scheduler 38, running on a storage management system based host controller which is connected to the client network and interfaced to the resource scheduler. A plurality of scripts are loaded at start up for on-demand execution of communication tasks. More particularly, if the client computer and storage management system both utilize the same operating system, the SMA kernel can be utilized to execute I/O commands from software applications in the client computer without first translating the I/O commands to high level commands as is done in the file management system.

The resource scheduler 38 supervises the flow of data through the universal storage management system. More particularly, the resource scheduler determines whether individual data units can be passed directly to the back-end interface 40 or whether the data unit must first be processed by one of the device level applications 42 or RAID applications 44. Block level data units are passed to the resource scheduler from either the front-end interface or the file management system.

The back-end interface 40 manages the storage devices 14. The storage devices are connected to the back-end interface by one or more SCSI type controllers through which the storage devices are connected to the storage management system computer. In order to control non-standard SCSI devices, the back-end interface includes pre-loaded scripts and may also include device specific drivers.

Figure 2:
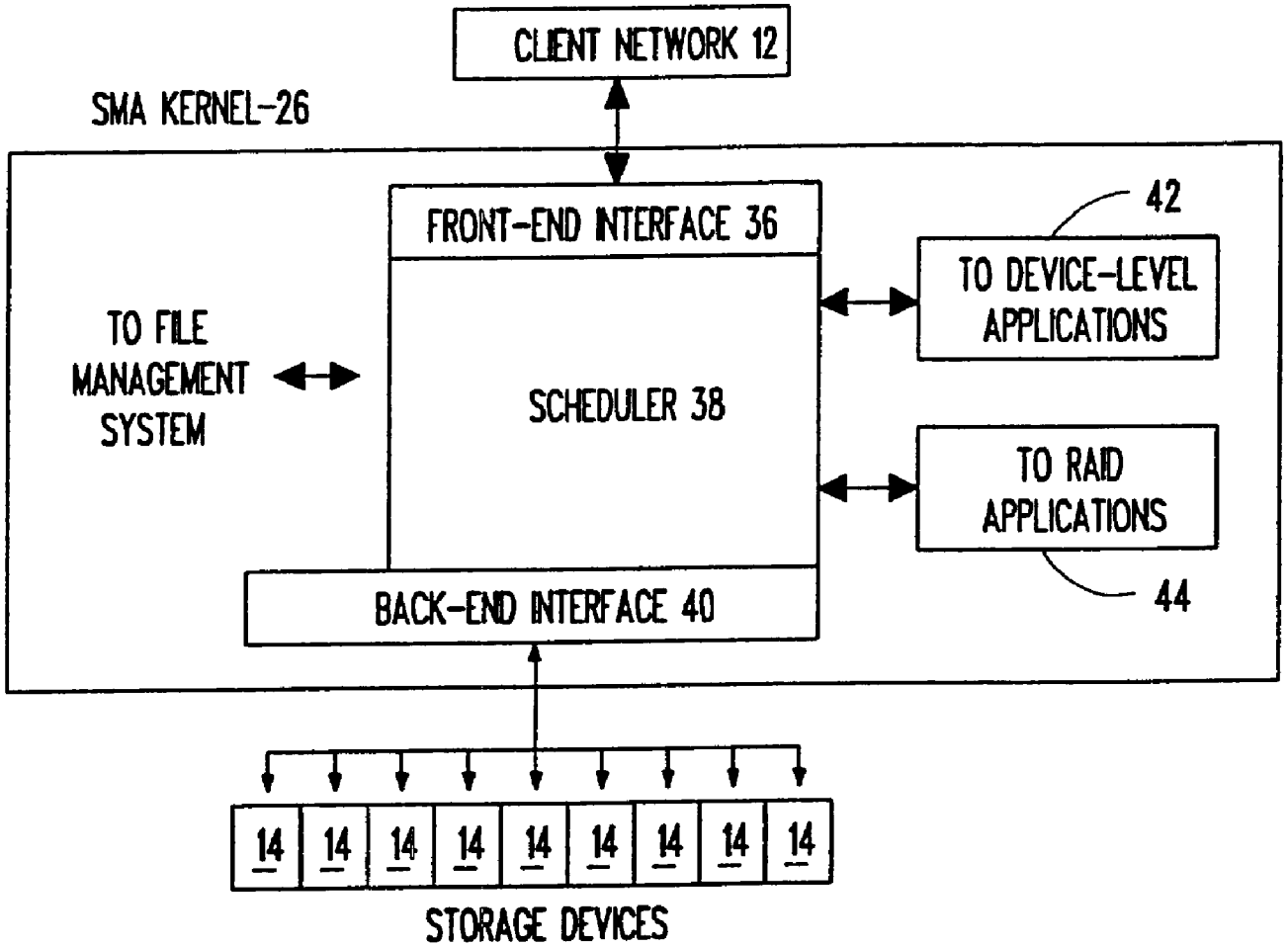
FIG. 2 is a block diagram of the SMA kernel.
Figure 2A:
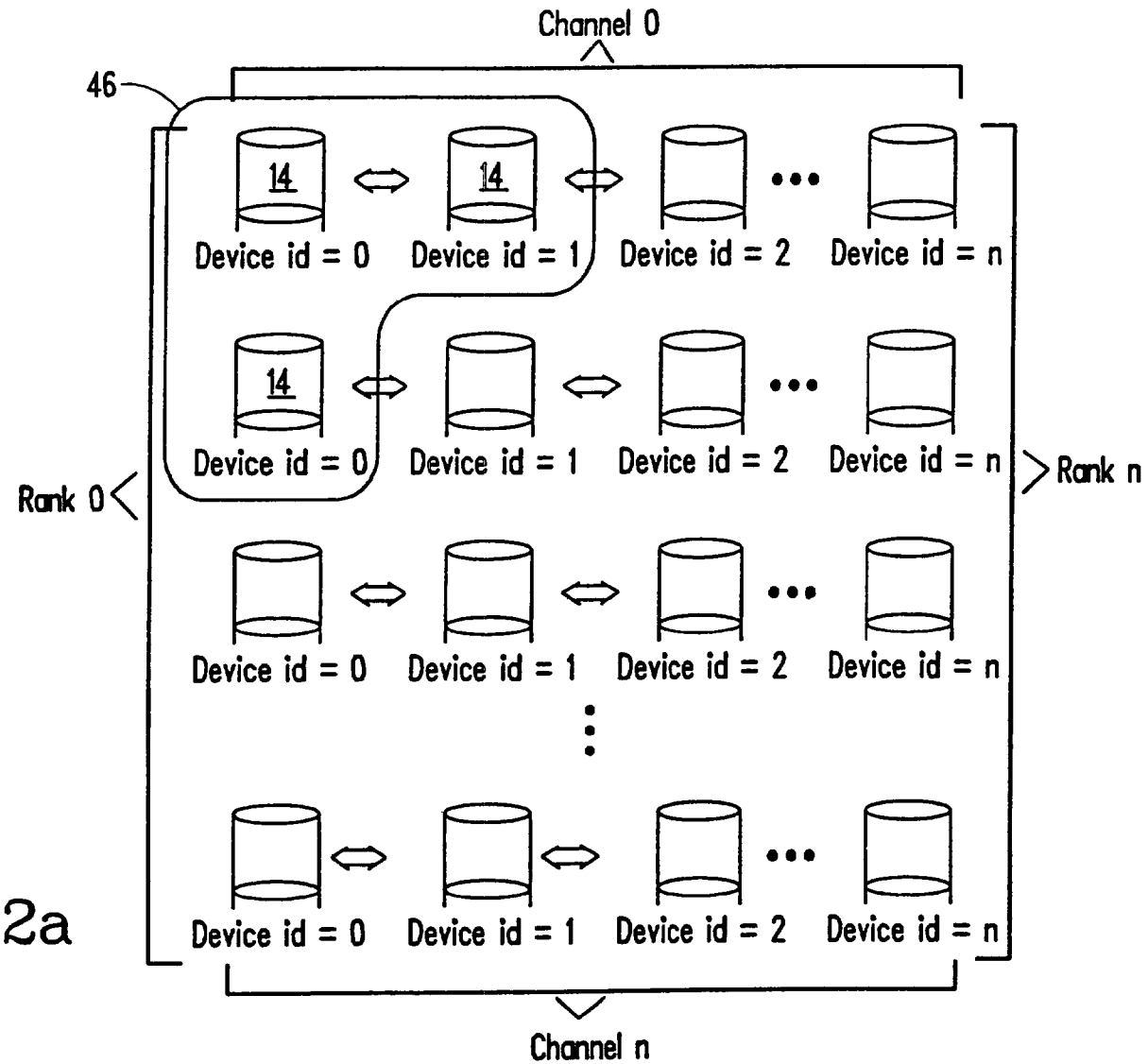
FIG. 2a illustrates the storage devices of FIG. 2.

FIG. 2a illustrates the storage devices 14 of FIG. 2. The storage devices are identified by rank (illustrated as columns), channel (illustrated as rows) and device ID. A rank is a set of devices with a common ID, but sitting on different channels. The number of the rank is designated by the common device ID. For example, rank 0 includes the set of all devices with device ID=0. The storage devices may be addressed by the system individually or in groups called arrays 46. An array associates two or more storage devices 14 (either physical devices or logical devices) into a RAID level. A volume is a logical entity for the host such as a disk or tape or array which has been given a logical SCSI ID. There are four types of volumes including a partition of an array, an entire array, a span across arrays, and referring to a single device.

The storage management system employs high level commands to access the storage devices. The high level commands include array commands and volume commands, as follows:

Array Commands

"acreate"

The acreate command creates a new array by associating a group of storage devices in the same rank and assigning them a RAID level.

Syntax:

acreate (in rank_id, int level, char *aname, int ch_use);

| | |
|---|---|
| rank__id | Id of rank on which the array will be created. |
| level | RAID level to use for the array being created |
| aname | Unique name to be given to array. if NULL, one will be assigned by the system. |
| ch__use | bitmap indicating which channels to use in this set of drives. |
| Return | 0 |
| ERANK | Given rank does not exist or it is not available to create more arrays. |
| ELEVEL | Illegal RAID level |
| ECHANNEL | No drives exist in given bitmap or drives are already in use by another array. |

"aremove"

The aremove command removes the definition of a given array name and makes the associated storage devices available for the creation of other arrays.

Syntax:

aremove (char *aname);

aname name of the array to remove

Volume Commands

"vopen"

The vopen command creates and/or opens a volume, and brings the specified volume on-line and readies that volume for reading and/or writing.

Syntax:

vopen (char *arrayname, char *volname, VOLHANDLE *vh,int flags);

| | |
|---|---|
| arrayname | Name of the army on which to create/open the volume. |
| volname | Name of an existing volume or the name to be given to the volume to create. If left NULL, and the O__CREAT flag is given, one will be assigned by the system and this argument will contain the new name. |
| vh | When creating a volume, this contains a pointer to parameters to be used in the creation of requested volume name. If opening an existing volume, these parameters will be returned by the system. |
| flags | A constant with one or more of the following values. |
| O__CREAT | The system will attempt create the volume using the parameters give in vh. If the volume already exists, this flag will be ignored. |
| O__DENYRD | Denies reading privileges to any other tasks on this volume anytime after this call is made. |
| O__DENYWR | Deny writing privileges to any other tasks that open this volume anytime after this call is made. |
| O__EXCLUSIVE | Deny any access to this volume anytime after this call is made. |
| Return 0 | Successful open/creation of volume |
| EARRAY | Given array does not exist |
| EFULL | Given array is full |

"vclose"

The vclose command closes a volume, brings the specified volume off-line, and removes all access restrictions imposed on the volume by the task that opened it.

Syntax:

vclose (VOLHANDLE *vh);

| | |
|---|---|
| vh | Volume handle, returned by the system when the volume was opened/created |

"vread"

The vread command reads a specified number of blocks into a given buffer from an open volume given by "vh".

Syntax:

vread (VOLHANDLE *vh,char*bufptr, BLK_ADDR Iba, INT count);

| | | |
|---|---|---|
| vh | Handle of the volume to read from | |
| bufptr | Pointer to the address in memory where the data is to be read into | |
| Iba | Logical block address to read from | |
| count | Number of blocks to read from given volume | |
| Return | 0 | Successful read |
| EACCESS | | Insufficient rights to read from this volume |
| EHANDLE | | Invalid volume handle |
| EADDR | | Illegal logical block address |

"vwrite"

The vwrite command writes a specified number of blocks from the given buffer to an open volume given by "vh."

Syntax:

vwrite (VOLHANDLE *vh, char *bufptr, BLK_ADDR Iba, INT count);

| | |
|---|---|
| vh | Handle of the volume to write to |
| bufptr | Pointer to the address in memory where the data to be written to the device resides |
| Iba | Volume Logical block address to write to |
| count | Number of blocks to write to given volume |
| Return | 0 Successful read |
| EACCESS | Insufficient rights to write to this volume |
| EHANDLE | Invalid volume handle |
| EADDR | Illegal logical block address |

"volcpy"

The volcpy command copies "count" number of blocks from the location given by src_addr in src_vol to the logical block address given by dest_addr in dest_vol. Significantly, the command is executed without interaction with the client computer.

Syntax:

volcpy (VOLHANDLE *dest_vol, BLK_ADDR dest_Iba, VOLHANDLE *src_vol, BLK_ADDR src_Iba, ULONG count);

| | |
|---|---|
| dest_vol | handle of the volume to be written to |
| dest_Iba | destination logical block address |
| src_vol | handle of the volume to be read from |
| src_Iba | Source logical block address |
| count | Number of blocks to write to given volume |
| Return | 0 Successful read |
| EACCW | Insufficient rights to write to this destination volume |
| EACCR | Insufficient rights to read from source volume |
| EDESTH | Invalid destination volume handle |
| ESRCH | Invalid source volume handle |
| EDESTA | Illegal logical block address for destination volume |
| ESRCA | Illegal logical block address for source volume |

The modular design of the storage management system software provides some advantages. The SMA Kernel and file management system are independent program groups which do not have interdependency limitations. However, both program groups share a common application programming interface (API). Further, each internal software module (transport driver, file system supervisor, device handler, front-end interface, back-end interface and scheduler) interacts through a common protocol. Development of new modules or changes to an existing module thus do not require changes to other SMA modules, provided compliance with the protocol is maintained. Additionally, software applications in the client computer are isolated from the storage devices and their associated limitations. As such, the complexity of application development and integration is reduced, and reduced complexity allows faster development cycles. The architecture also offers high maintainability, which translates into simpler testing and quality assurance processes and the ability to implement projects in parallel results in a faster time to market.

Figure 3:
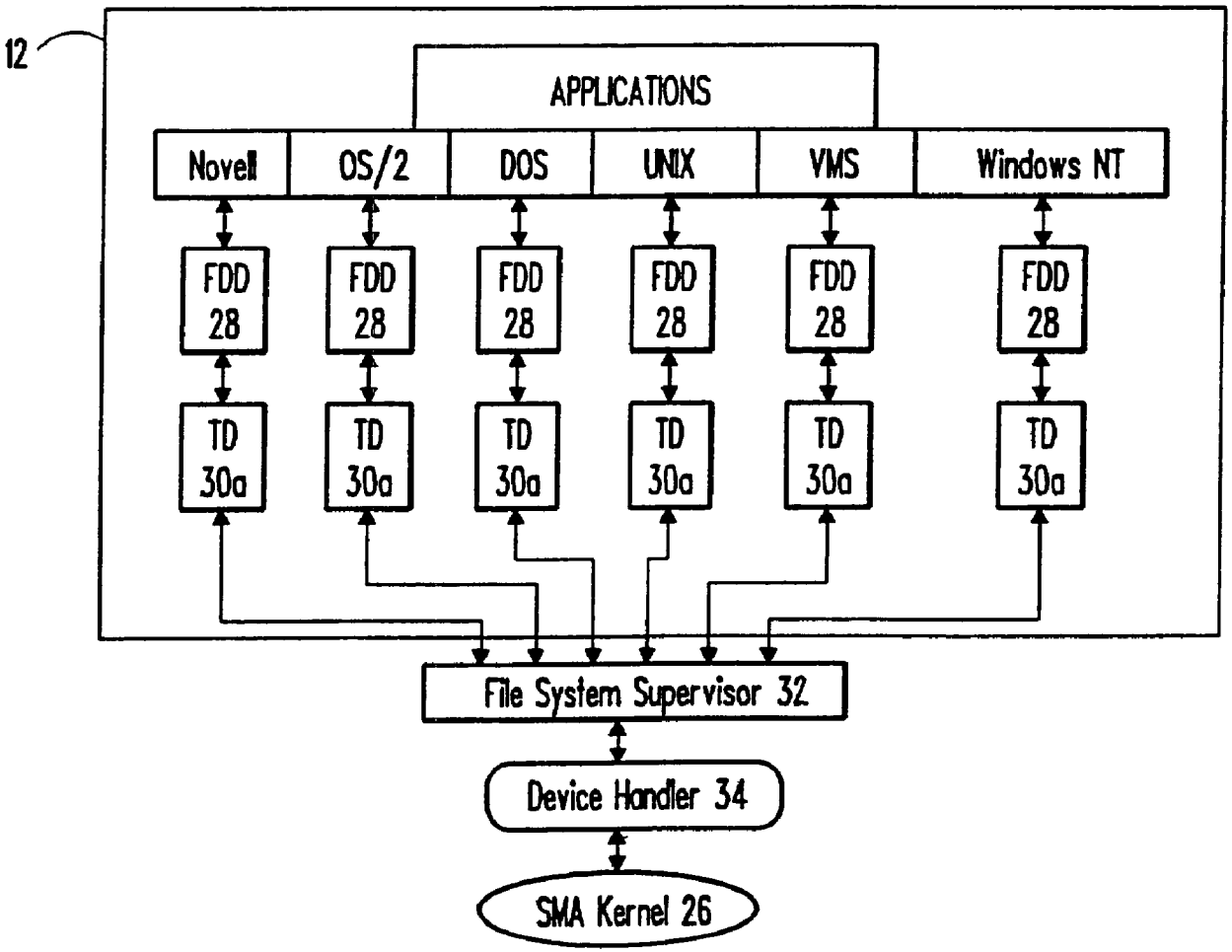
FIGS. 3 and 4 are block diagrams of an example cross-platform network employing the universal storage management system.
Figure 4:
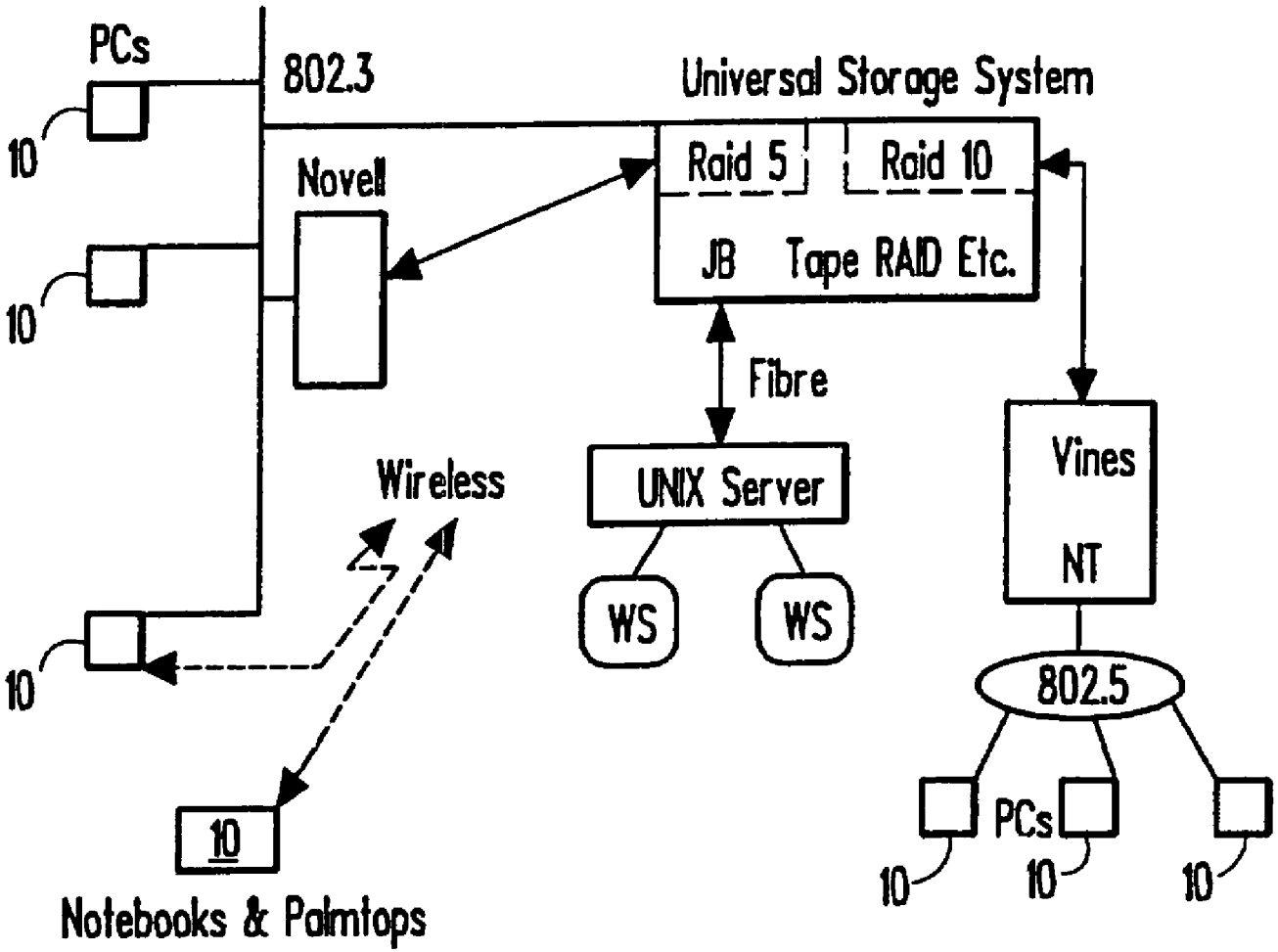

FIGS. 3 & 4 illustrate a cross platform client network employing the universal storage management system. A plurality of client computers which reside in different networks are part of the overall architecture. Individual client computers 10 and client networks within the cross platform network utilize different operating systems. The illustrated architecture includes a first group of client computers on a first network operating under a Novell based operating system, a second group of client computers on a second network operating under OS/2, a third group of client computers on a third network operating under DOS, a fourth group of client computers on a fourth network operating under UNIX, a fifth group of client computers on a fifth network operating under VMS and a sixth group of client computers on a sixth network operating under Windows-NT. The file management system includes at least one dedicated file device driver and transport driver for each operating system with which the storage management system will interact. More particularly, each file device driver is specific to the operating system with which it is used. Similarly, each transport driver is connection specific. Possible connections include SCSI-2, SCSI-3, fiber link, 802.3, 802.5, synchronous and a synchronous RS232, wireless RF, and wireless IR.

The universal storage management system utilizes a standard file format which is selected based upon the cross platform client network for ease of file management system implementation. The file format may be based on UNIX, Microsoft-NT or other file formats. In order to facilitate operation and enhance performance, the storage management system may utilize the same file format and operating system utilized by the majority of client computers connected thereto, however this is not required. Regardless of the file format selected, the file management system includes at least one file device driver, at least one transport driver, a file system supervisor and a device handler to translate I/O commands from the client computer.

Figure 5:
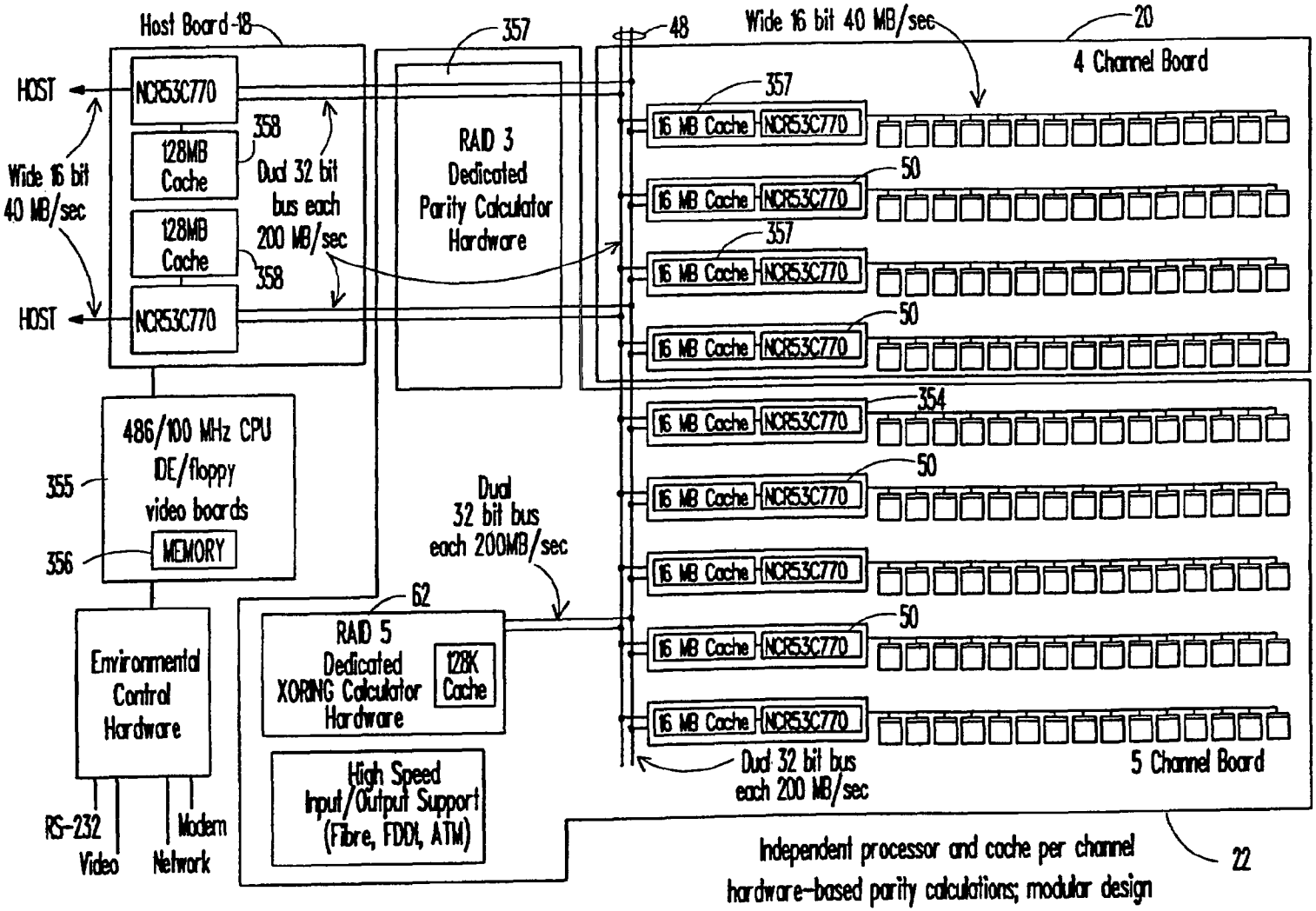
FIG. 5 is a block diagram of a RAID board for storage of data in connection with the universal storage management system.
Figure 6:
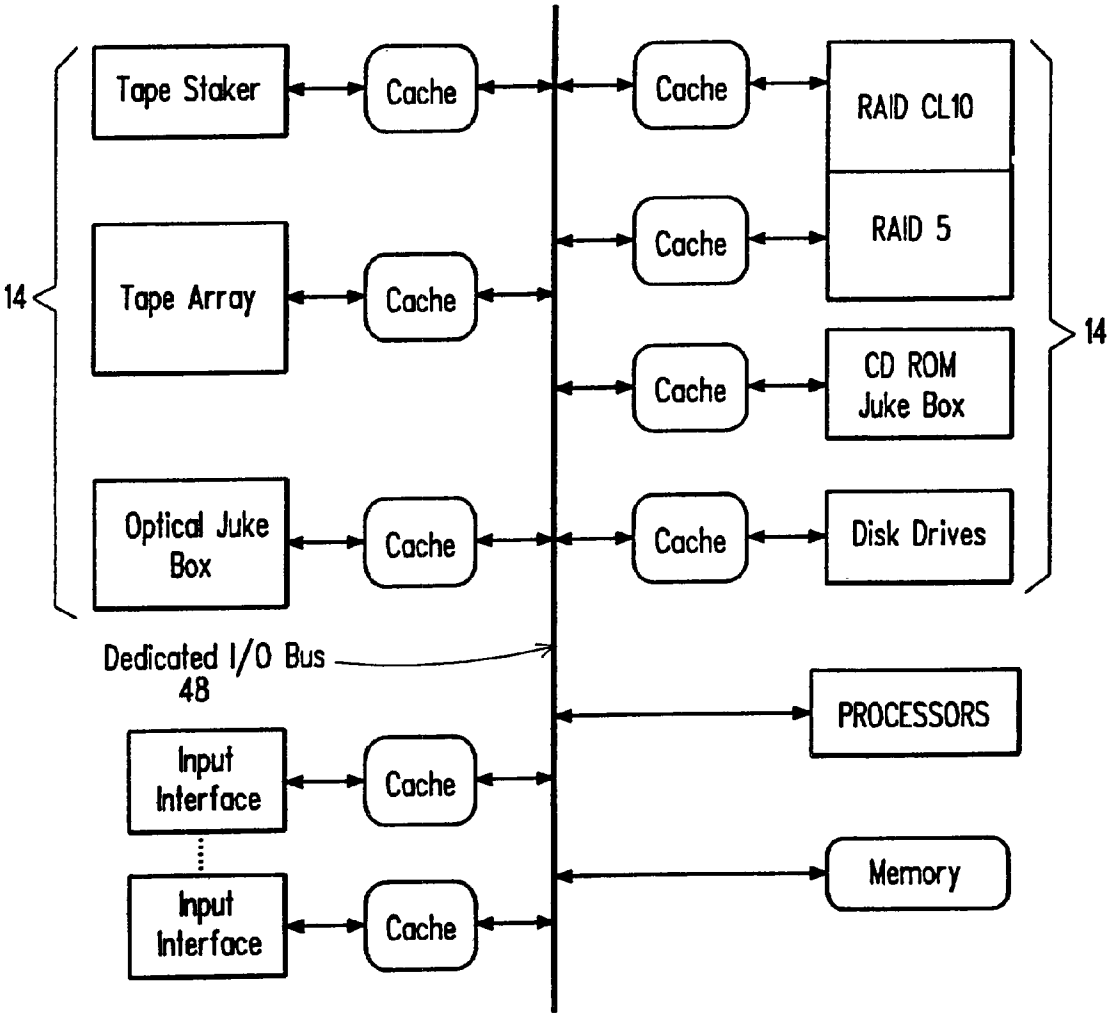
FIG. 6 is a block diagram of the universal storage management system which illustrates storage options.
Figure 10A:
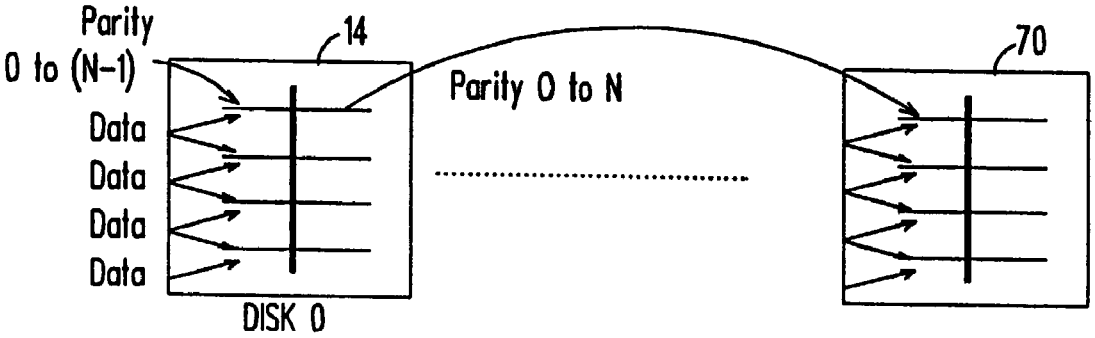
Figure 10B:
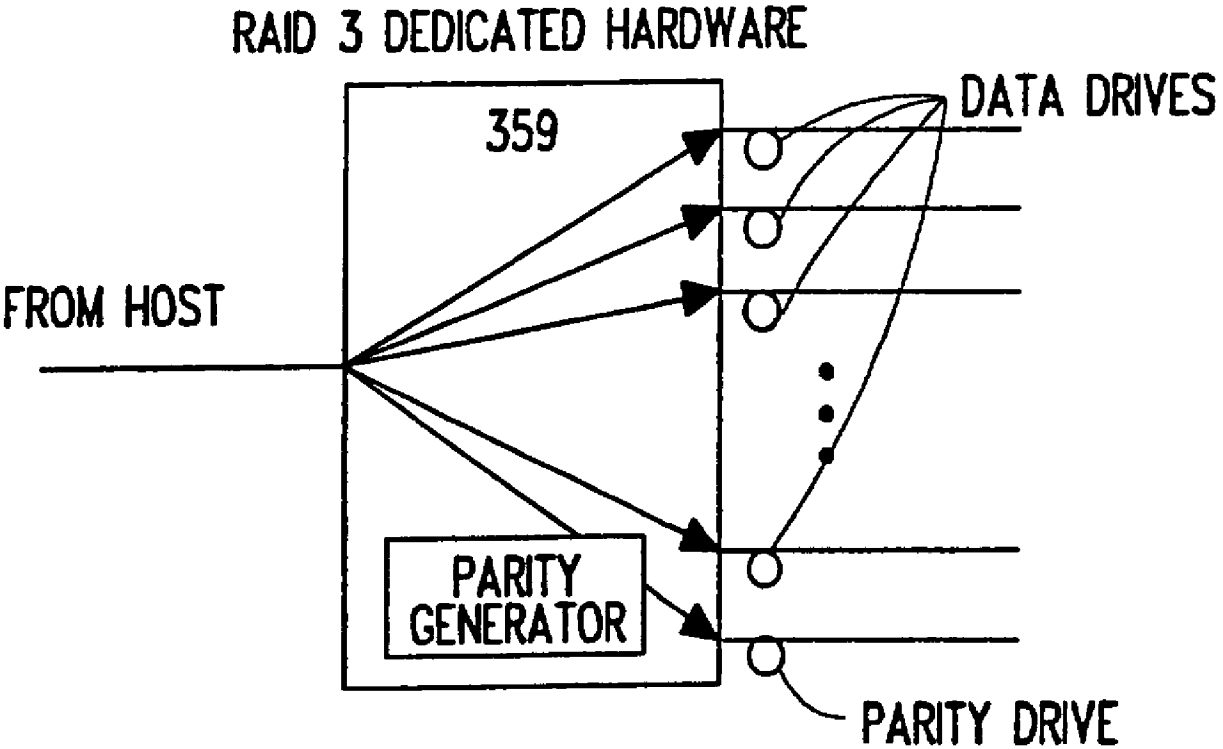

Referring to FIGS. 5, 6 and 10b, the storage management system is preferably capable of simultaneously servicing multiple client computer I/O requests at a performance level which is equal to or better than that of individual local drives. In order to provide prompt execution of I/O operations for a group of client computers the universal storage management system computer employs a powerful microprocessor or multiple microprocessors 355 capable of handling associated overhead for the file system supervisor, device handler, and I/O cache. Available memory 356 is relatively large in order to accommodate the multi-tasking storage management system operating system running multiple device utilities such as backups and juke box handlers. A significant architectural advance of the RAID is the use of multiple SCSI processors with dedicated memory pools 357. Each processor 350 can READ or WRITE devices totally in parallel. This provides the RAID implementation with true parallel architecture. Front end memory 358 could also be used as a first level of I/O caching for the different client I/O's. A double 32 bit wide dedicated I/O bus 48 is employed for I/O operations between the storage management system and the storage device modules 354. The I/O bus is capable of transmission at 200 MB/sec, and independent 32 bit wide caches are dedicated to each I/O interface.

Figure 7:
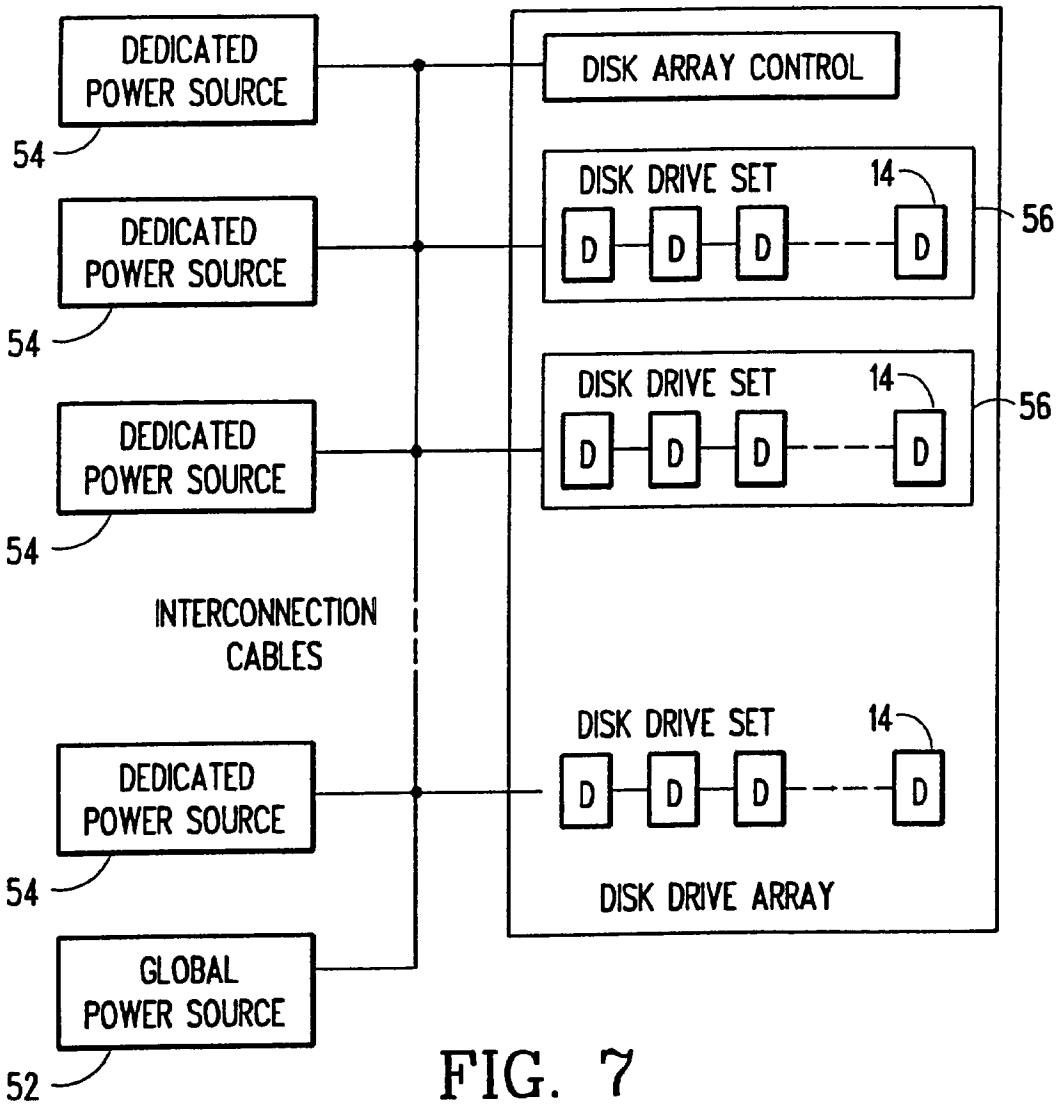
FIG. 7 is a block diagram of the redundant storage device power supply.
Figure 21:
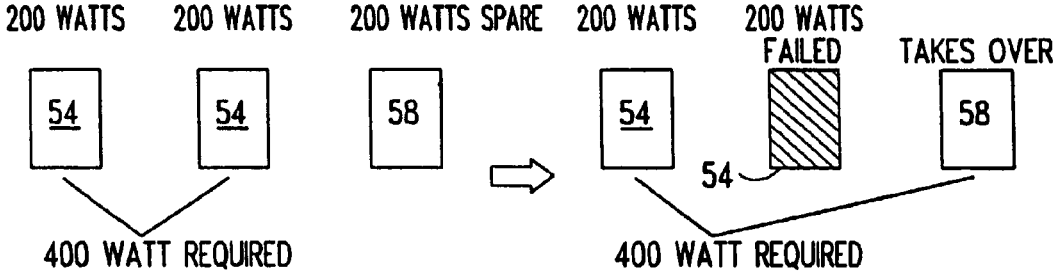
FIG. 21 is a block diagram which illustrates horizontal power sharing for handling power failures.
Figure 22:
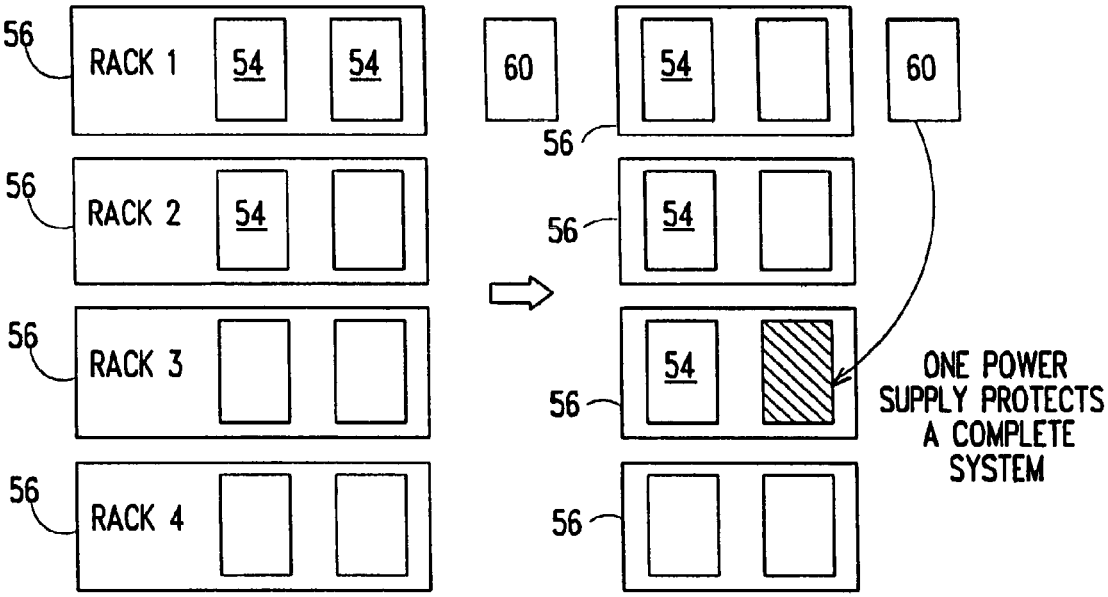
FIG. 22 is a block diagram which illustrates vertical power sharing for handling power failures.

Referring to FIGS. 7, 21 and 22, a redundant power supply array is employed to maintain power to the storage devices when a power supply fails. The distributed redundant low voltage power supply array includes a global power supply 52 and a plurality of local power supplies 54 interconnected with power cables throughout a disk array chassis. Each local power supply provides sufficient power for a rack 56 of storage devices 14. In the event of a failure of a local power supply 54, the global power supply 52 provides power to the storage devices associated with the failed local power supply. In order to provide sufficient power, the global power supply therefore should have a power capacity rating at least equal to the largest capacity local power supply.

Preferably both horizontal and vertical power sharing are employed. In horizontal power sharing the power supplies 54 for each rack of storage devices includes one redundant power supply 58 which is utilized when a local power supply 54 in the associated rack fails. In vertical power sharing a redundant power supply 60 is shared between a plurality of racks 56 of local storage devices 54.

Figure 8:
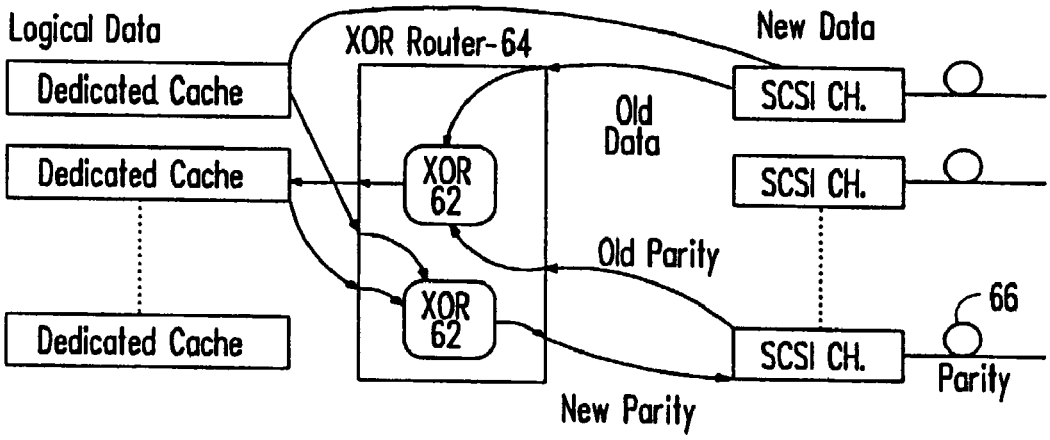
FIGS. 8-11 are block diagrams which illustrate XOR and parity computing processes.
Figure 9:
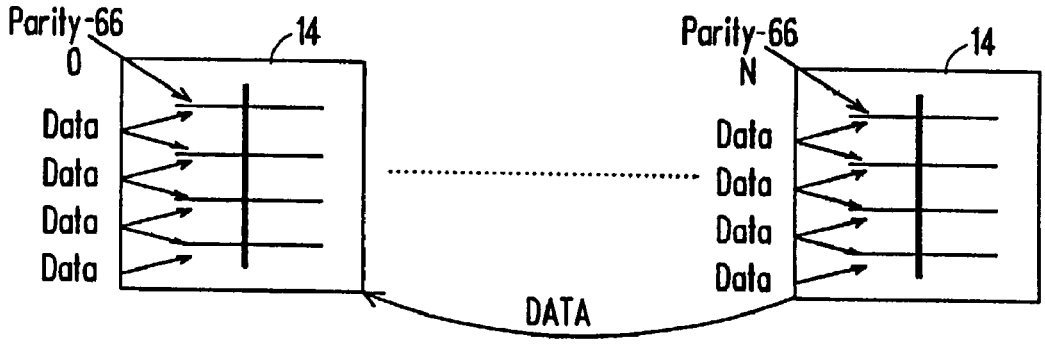

Referring now to FIGS. 8 and 9, a redundant array of independent disks ("RAID") is provided as a storage option. For implementation of the RAID, the storage management system has multiple SCSI-2 and SCSI-3 channels having from 2 to 11 independent channels capable of handling up to 1080 storage devices. The RAID reduces the write overhead penalty of known RAIDS which require execution of Read-modify-Write commands from the data and parity drives when a write is issued to the RAID. The parity calculation procedure is an XOR operation between old parity data and the old logical data. The resulting data is then XORed with the new logical data. The XOR operations are done by dedicated XOR hardware 62 in an XOR router 64 to provide faster write cycles. This hardware is dedicated for RAID-4 or RAID-5 implementations. Further, for RAID-3 implementation, parity generation and data striping have been implemented by hardware 359. As such, there is no time overhead cost for this parity calculation which is done "on the fly," and the RAID-3 implementation is as fast as a RAID-0 implementation.

Figure 11:
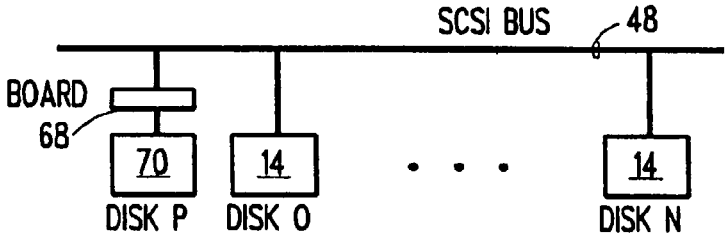

Referring now to FIGS. 9-11, at least one surface 66 of each of the drives is dedicated for parity. As such, a RAID-3 may be implemented in every individual disk of the array with the data from all other drives (See FIG. 9 specifically). The parity information may be sent to any other parity drive surface (See FIG. 10 specifically). In essence, RAID-3 is implemented within each drive of the array, and the generated parity is transmitted to the appointed parity drive for RAID-4 implementation, or striped across all of the drives for RAID-5 implementation. The result is a combination of RAID-3 and RAID-4 or RAID-5, but without the write overhead penalties. Alternatively, if there is no internal control over disk drives, as shown in FIG. 11, using standard double ported disk drives, the assigned parity drive 70 has a dedicated controller board 68 associated therewith for accessing other drives in the RAID via the dedicated bus 48, to calculate the new parity data without the intervention of the storage management system computer microprocessor.

Figure 12A:
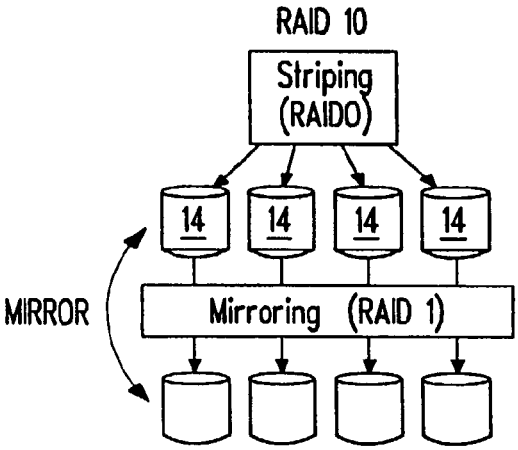
FIGS. 12a-13 are block diagrams illustrating RAID configurations for improved efficiency.
Figure 12B:
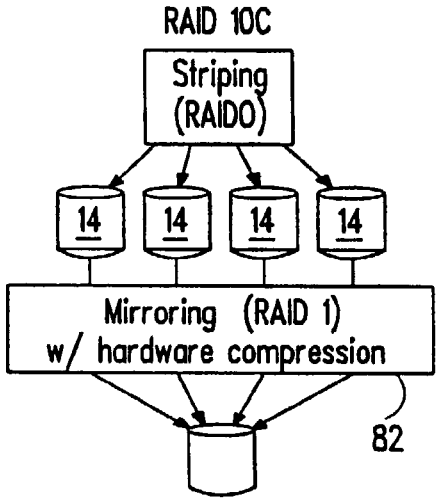
Figure 13:
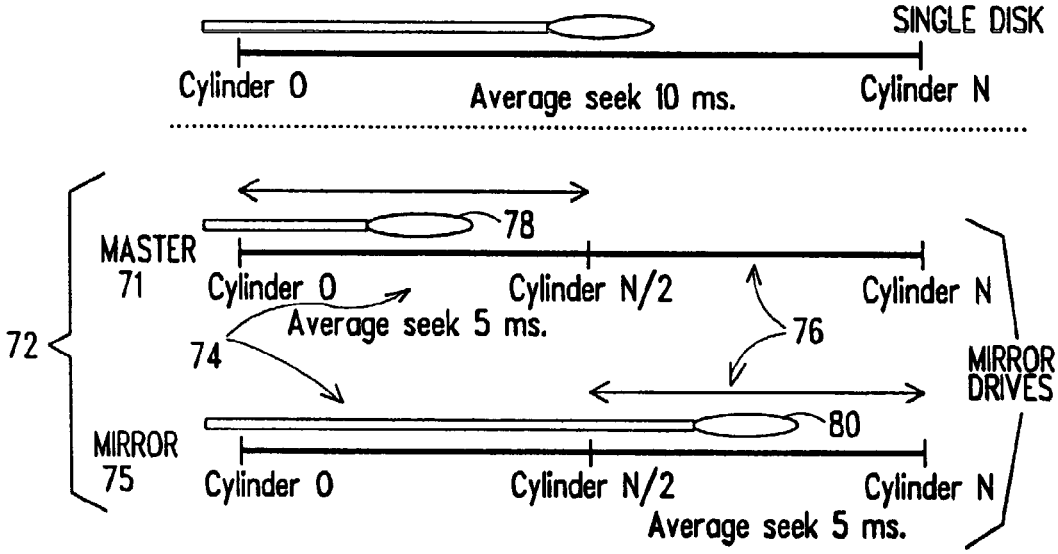

Referring to FIGS. 12a, 12b and 13, the storage management system optimizes disk mirroring for RAID-1 implementation. Standard RAID-1 implementations execute duplicate WRITE commands for each of two drives simultaneously. To obtain improved performance the present RAID divides a logical disk 72, such as a logical disk containing a master disk 71 and a mirror disk 75, into two halves 74, 76. This is possible because the majority of the operations in a standard system are Read operations, and since the information is contained in both drives. The respective drive heads 78, 80 of the master and mirror disks are then positioned at a halfway point in the first half 74 and second half 76, respectively. If the Read request goes to the first half 74 of the logical drive 72, then this command is serviced by the master disk 71. If the Read goes to the second half 76 of the logical drive 72, then it is serviced by the mirror disk 75. Since each drive head only travels one half of the total possible distance, average seek time is reduced by a factor of two. Additionally, the number of storage devices required for mirroring can be reduced by compressing 82 mirrored data and thereby decreasing the requisite number of mirror disks. By compressing the mirrored data "on the fly" overall performance is maintained.

File storage routines may be implemented to automatically select the type of media upon which to store data. Decision criteria for determining which type of media to store a file into can be determined from a data file with predetermined attributes. Thus, the file device driver can direct data to particular media in an intelligent manner. To further automate data storage, the storage management system includes routines for automatically selecting an appropriate RAID level for storage of each file. When the storage management system is used in conjunction with a computer network it is envisioned that a plurality of RAID storage options of different RAID levels will be provided. In order to provide efficient and reliable storage, software routines are employed to automatically select the appropriate RAID level for storage of each file based on file size. For example, in a system with RAID levels 3 and 5, large files might be assigned to RAID-3, while small files would be assigned to RAID-5. Alternatively, the RAID level may be determined based on block size, as predefined by the user.

Figure 14:
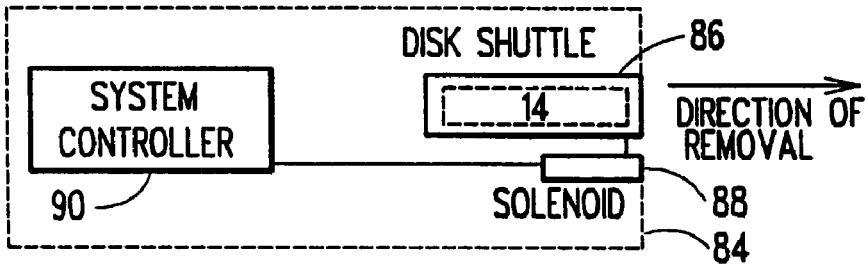
FIG. 14 is a block diagram of the automatic failed disk ejection system.
Figure 15:
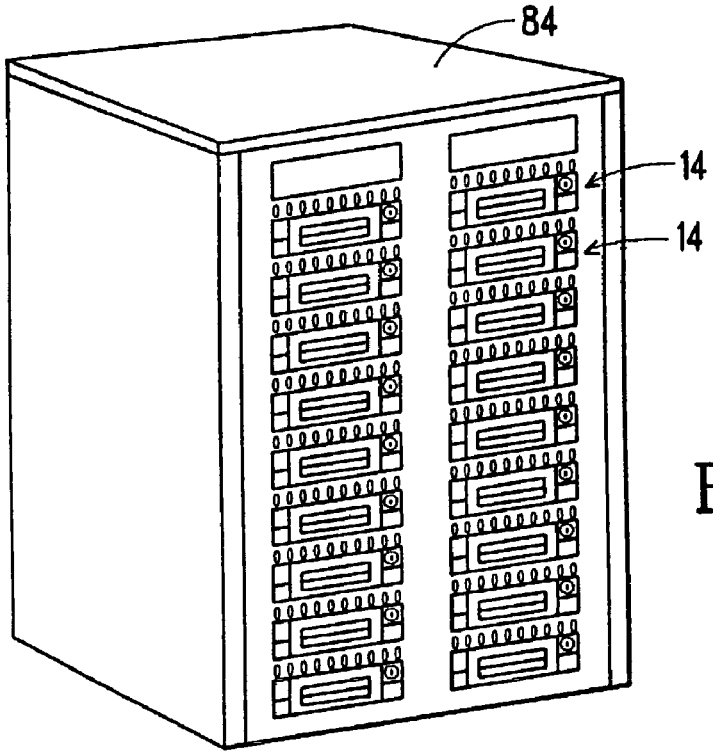
FIGS. 15 and 15a are perspective views of the storage device chassis.

Referring now to FIGS. 14 and 15, the RAID disks 14 are arrayed in a protective chassis 84. The chassis includes the global and local power supplies, and includes an automatic disk eject feature which facilitates identification and replacement of failed disks. Each disk 14 is disposed in a disk shuttle 86 which partially ejects from the chassis in response to a solenoid 88. A system controller 90 controls securing and releasing of the disk drive mounting shuttle 86 by actuating the solenoid 88. When the storage system detects a failed disk in the array, or when a user requests release of a disk, the system controller actuates the solenoid associated with the location of that disk and releases the disk for ejection.

Figure 20:
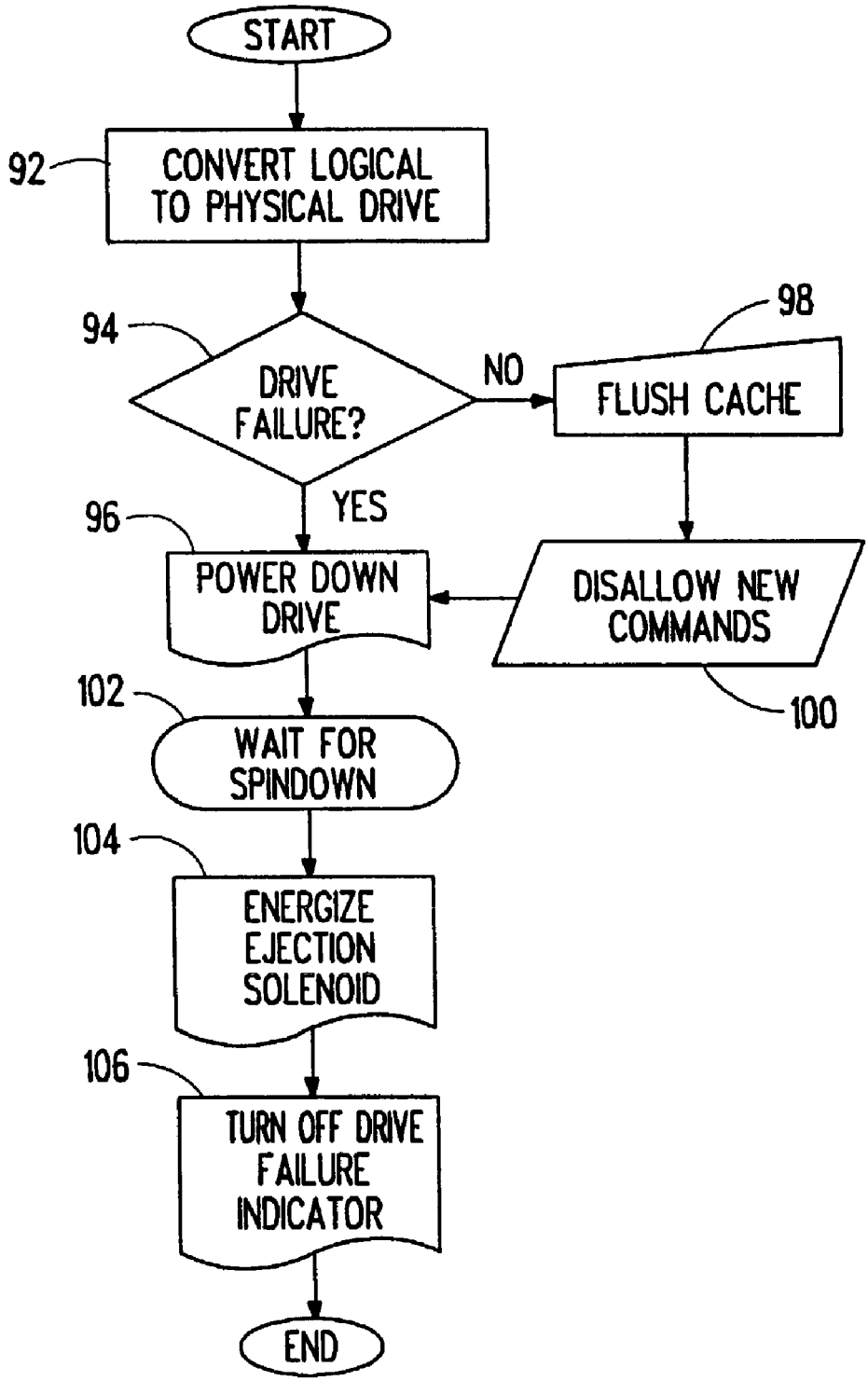
FIG. 20 is an automatic storage device ejection flow diagram.

An automatic storage device ejection method is illustrated in FIG. 20. In an initial step 92 a logical drive to physical drive conversion is made to isolate and identify the physical drive being worked upon. Then, if a drive failure is detected in step 94, the drive is powered down 96. If a drive failure is not detected, the cache is flushed 98 and new commands are disallowed 100 prior to powering the drive down 96. After powering down the drive, a delay 102 is imposed to wait for drive spin-down and the storage device ejection solenoid is energized 104 and the drive failure indicator is turned off 106.

Figure 16:
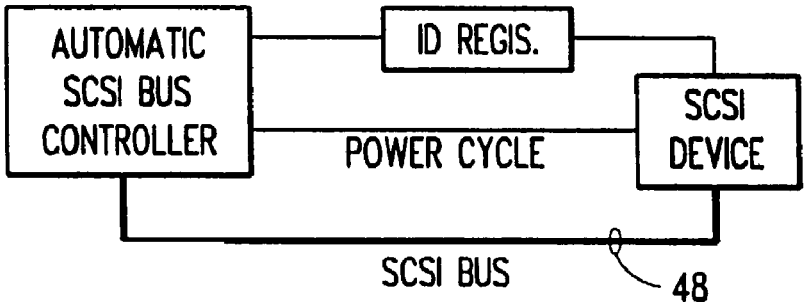
FIG. 16 is a block diagram which illustrates loading of a new SCSI ID in a disk.
Figure 17:
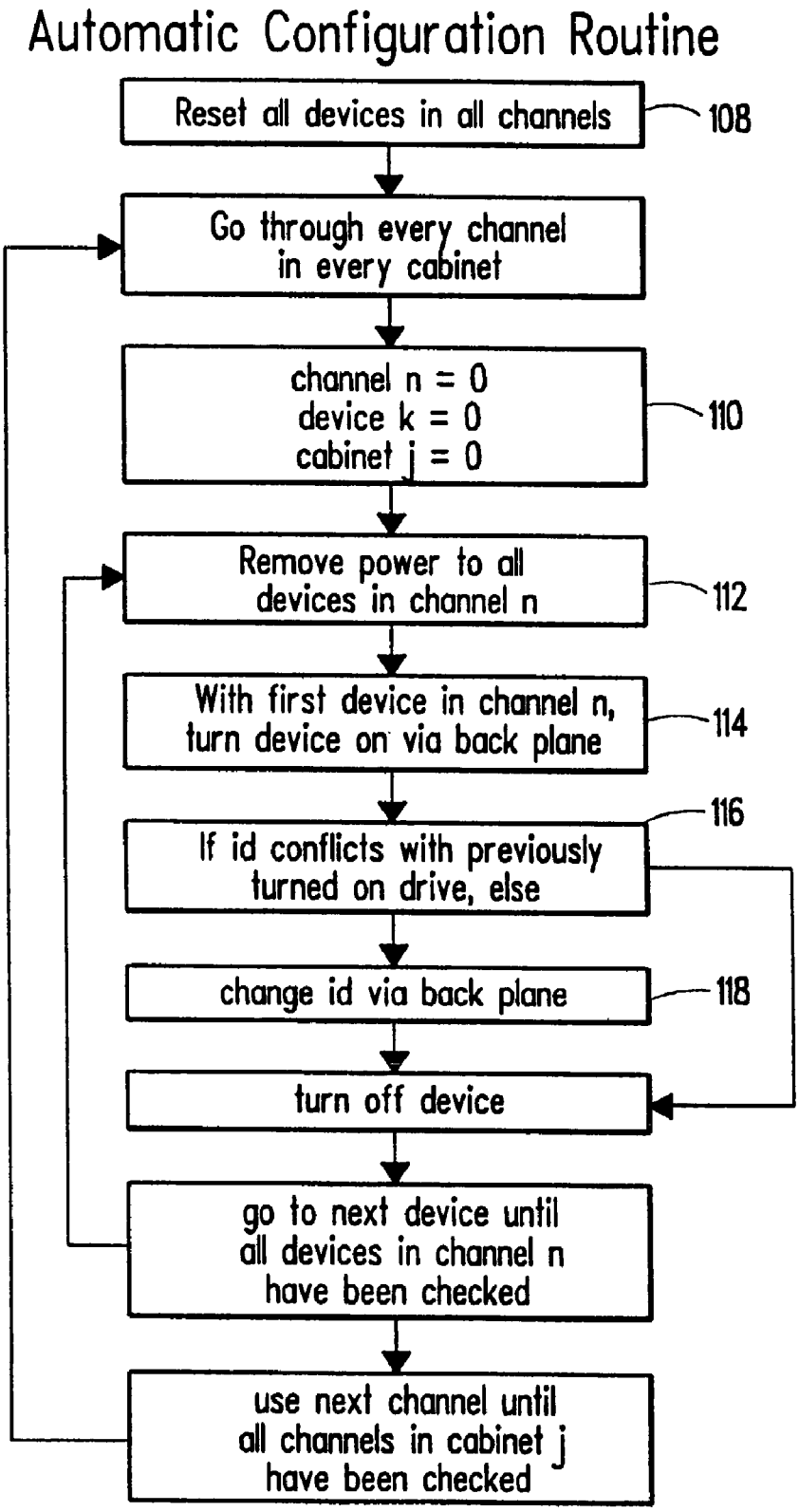
FIG. 17 is a flow diagram which illustrates the automatic initial configuration routine.

Referring to FIGS. 16 & 17, an automatic configuration routine can be executed by the backplane with the dedicated microprocessor thereon for facilitating configuring and replacement of failed storage devices. The backplane microprocessor allows control over power supplied to individual storage devices 14 within the pool of storage devices. Such individual control allows automated updating of the storage device IDs. When a storage device fails, it is typically removed and a replacement storage device is inserted in place of the failed storage device. The drive will be automatically set to the ID of the failed drive, as this information is saved in SRAM on the backplane when the automatic configuration routine was executed at system initialization (FIG. 17). When initializing the system for the first time, any device could be in conflict with another storage device in the storage device pool, the system will not be able to properly address the storage devices. Therefore, when a new system is initialized the automatic configuration routine is executed, to assure that the device Ids are not in conflict. As part of the automatic ID configuration routine all devices are reset 108, storage device identifying variables are set 110, and each of the storage devices 14 in the pool is powered down 112. Each individual storage device is then powered up 114 to determine if that device has the proper device ID 116. If the storage device has the proper ID, then the device is powered down and the next storage device is tested. If the device does not have the proper ID, then the device ID is reset 118 and the storage device is powercycled. The pseudocode for the automatic ID configuration routine includes the following steps:

```
1.  Reset all disks in all channels
2.  Go through every channel in every cabinet:
3.  channel n = 0
        cabinet j = 0
        drive k = 0
4.  Remove power to all disks in channel n
5.  With first disk in channel n
    a.  turn drive on via back plane
    b.  if its id conflicts with previously turned on drive, change its id
        via back plane then turn drive off
    c.  turn drive off
    d.  goto next drive until all drives in channel n have
        been checked.
    Use next channel until all channels in cabinet j have
    been checked.
```

Figure 15A:
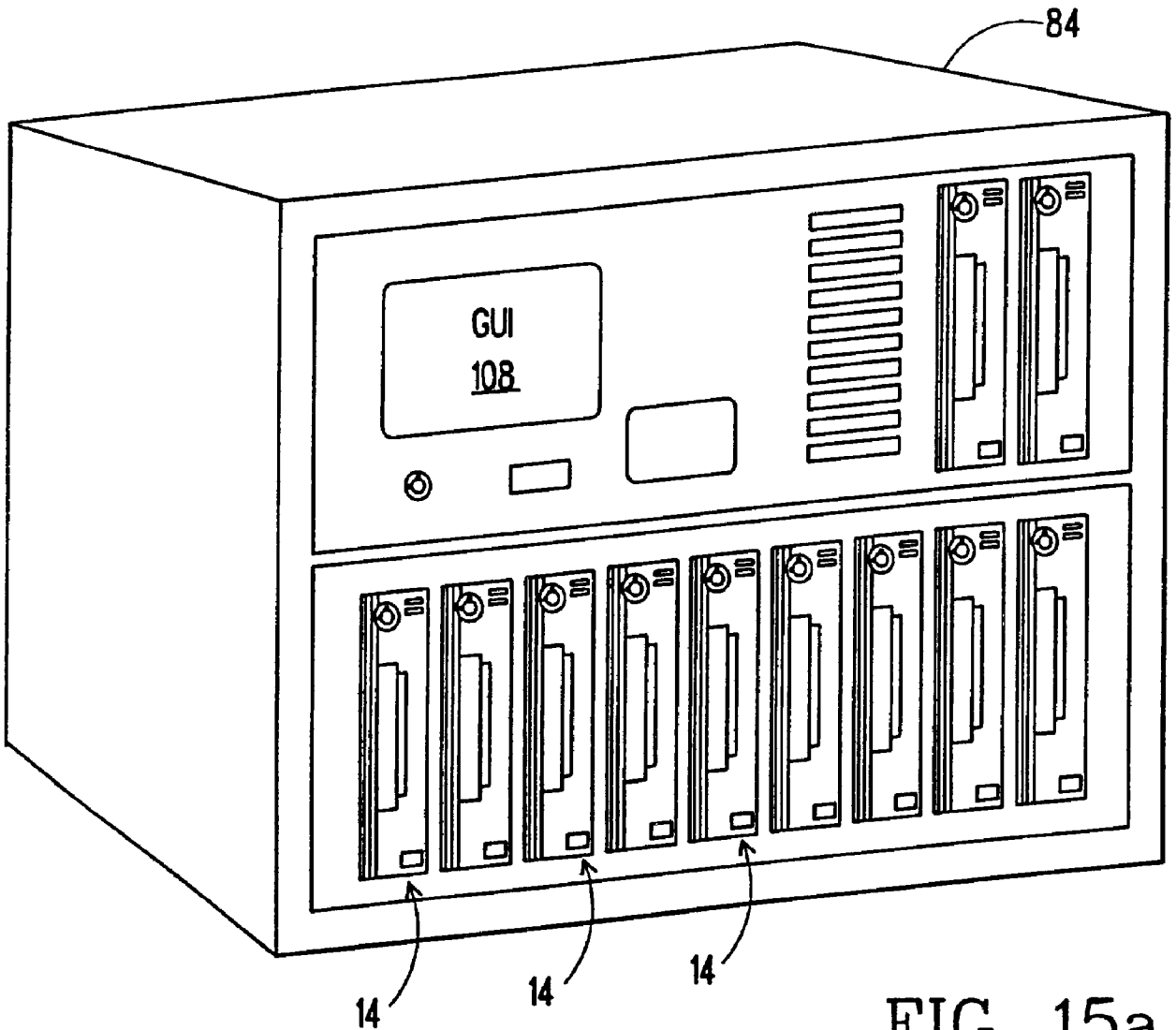

Automatic media selection is employed to facilitate defining volumes and arrays for use in the system. As a practical matter, it is preferable for a single volume or array to be made up of a single type of storage media. However, it is also preferable that the user not be required to memorize the location and type of each storage device in the pool, i.e., where each device is. The automatic media selection feature provides a record of each storage device in the pool, and when a volume or array is defined, the location of different types of storage devices are brought to the attention of the user. This and other features are preferably implemented with a graphic user interface ("GUI") 108 (FIG. 15a) which is driven by the storage management system and displayed on a screen mounted in the chassis.

Further media selection routines may be employed to provide reduced data access time. Users generally prefer to employ storage media with a fast access time for storage of files which are being created or edited. For example, it is much faster to work from a hard disk than from a CD-ROM drive. However, fast access storage media is usually more costly than slow access storage media. In order to accommodate both cost and ease of use considerations, the storage management system can automatically relocate files within the system based upon the frequency at which each file is accessed. Files which are frequently accessed are relocated to and maintained on fast access storage media. Files which are less frequently accessed are relocated to and maintained on slower storage media.

Figure 18:
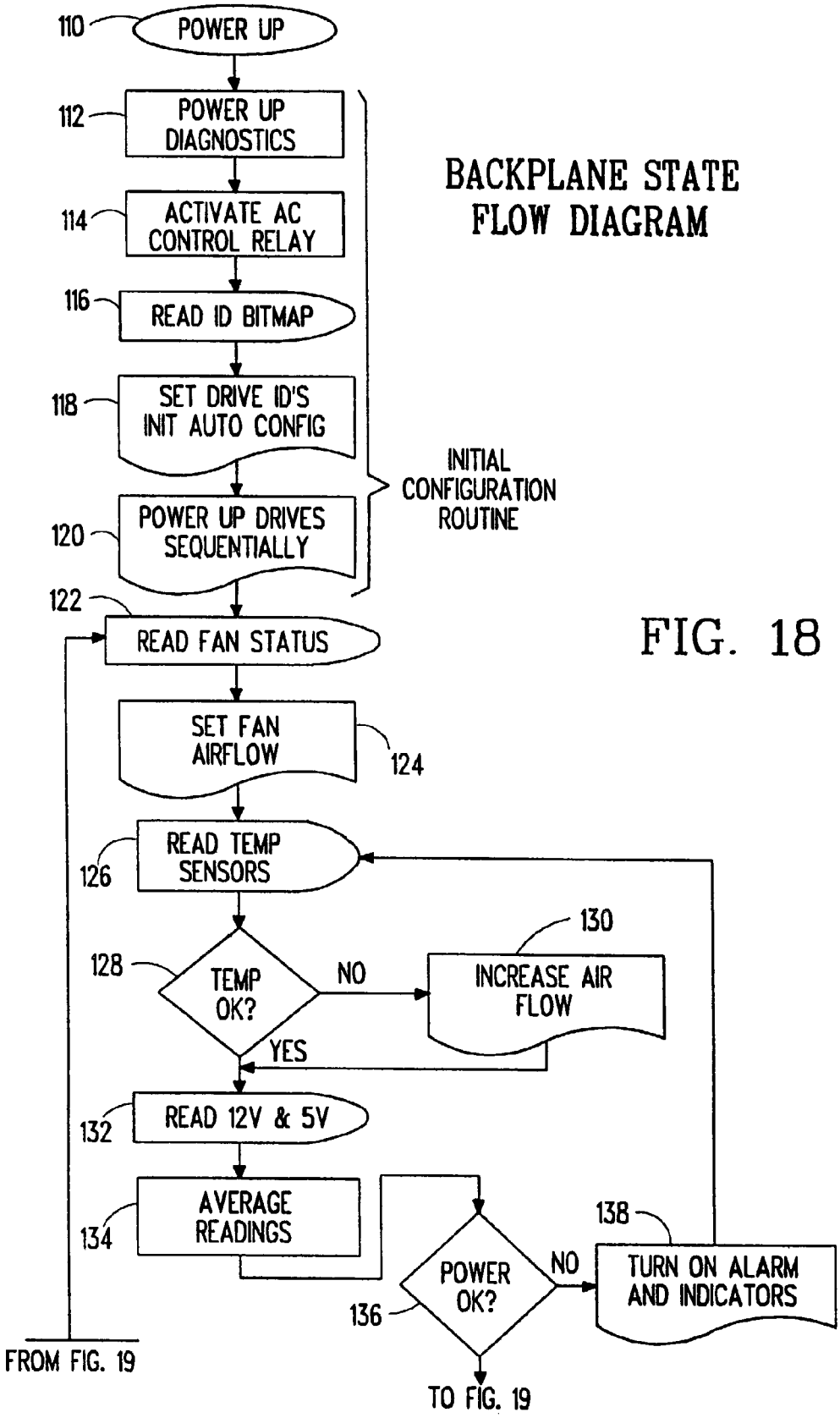
FIGS. 18 & 19 are backplane state flow diagrams.
Figure 19:
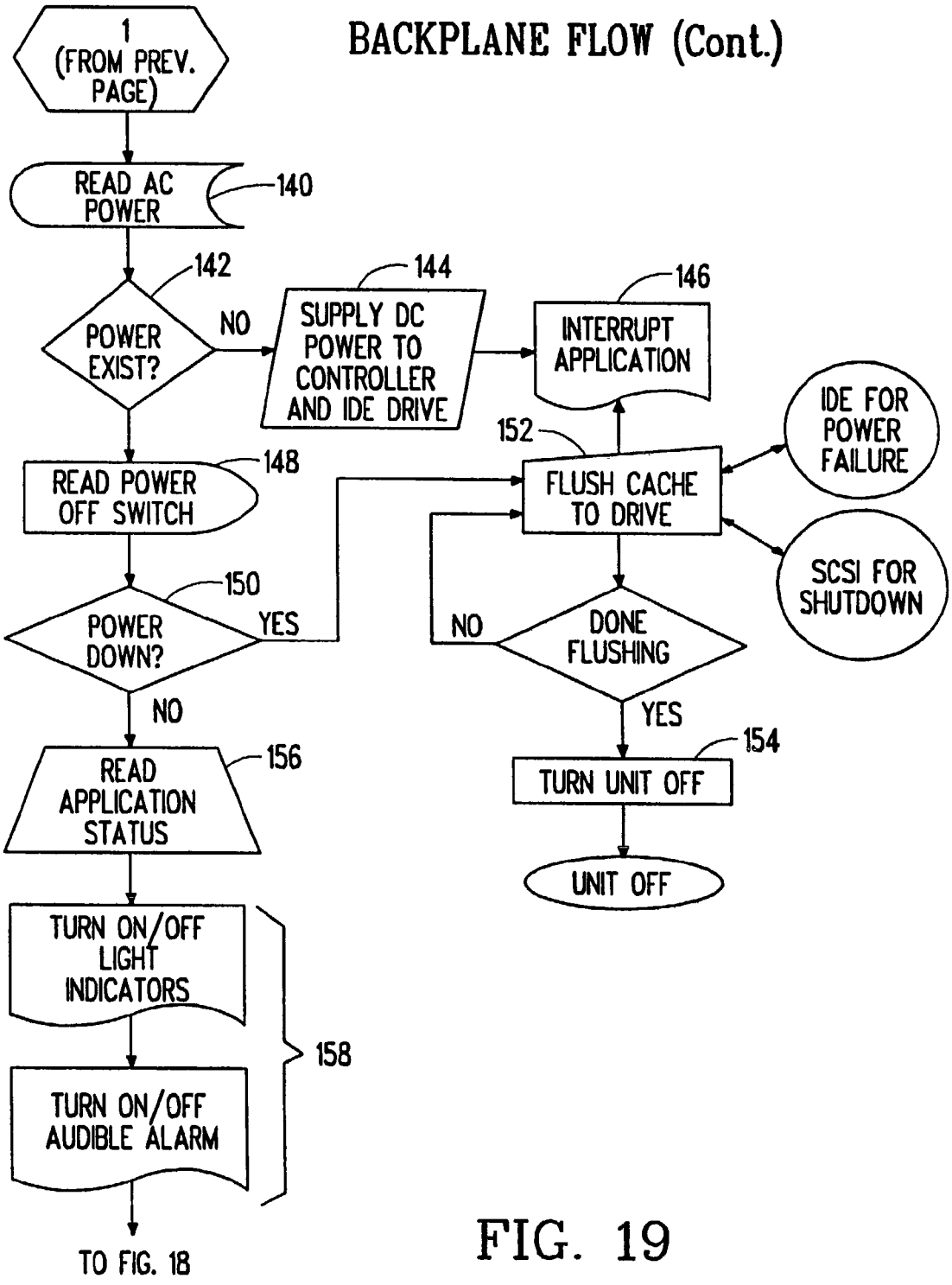

The method executed by the microprocessor controlled backplane is illustrated in FIGS. 18 & 19. In a series of initialization steps the backplane powers up 110, executes power up diagnostics 112, activates an AC control relay 114, reads the ID bitmap 116, sets the drive IDs 118, sequentially powers up the drives 120, reads the fan status 122 and then sets fan airflow 124 based upon the fan status. Temperature sensors located within the chassis are then polled 126 to determine 128 if the operating temperature is within a predetermined acceptable operating range. If not, airflow is increased 130 by resetting fan airflow. The backplane then reads 132 the 12V and 5V power supplies and averages 134 the readings to determine 136 whether power is within a predetermined operating range. If not, the alarm and indicators are activated 138. If the power reading is within the specified range, the AC power is read 140 to determine 142 whether AC power is available. If not, DC power is supplied 144 to the controller and IDE drives and an interrupt 146 is issued. If AC power exists, the state of the power off switch is determined 148 to detect 150 a power down condition. If power down is active, the cache is flushed 152 (to IDE for power failure and to SCSI for shutdown) and the unit is turned off 154. If power down is not active, application status is read 156 for any change in alarms and indicators. Light and audible alarms are employed 158 if required. Fan status is then rechecked 122. When no problem is detected this routine is executed in a loop, constantly monitoring events.

Figure 23:
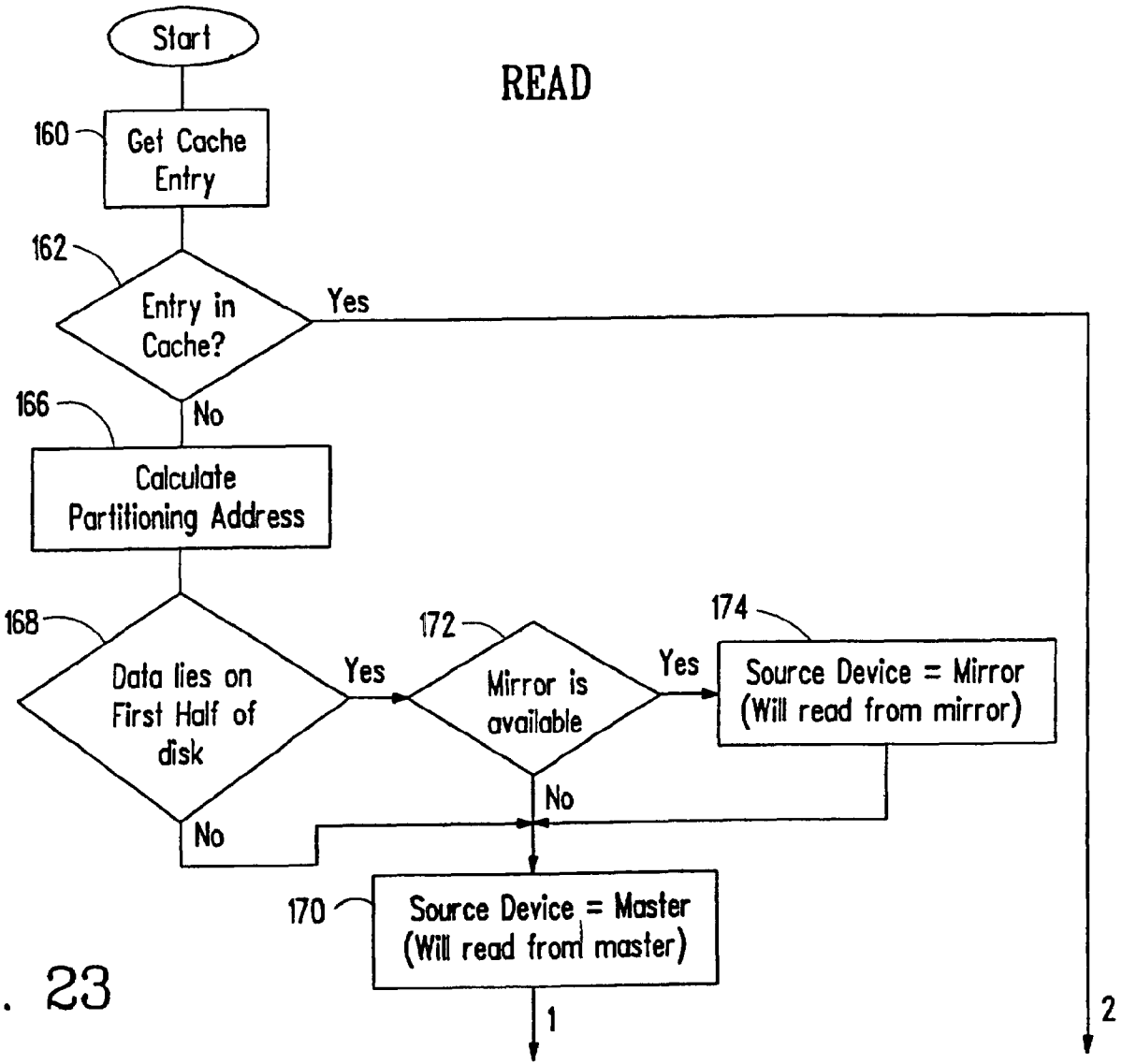
FIGS. 23-25 are flow diagrams which illustrate a READ cycle.
Figure 24:
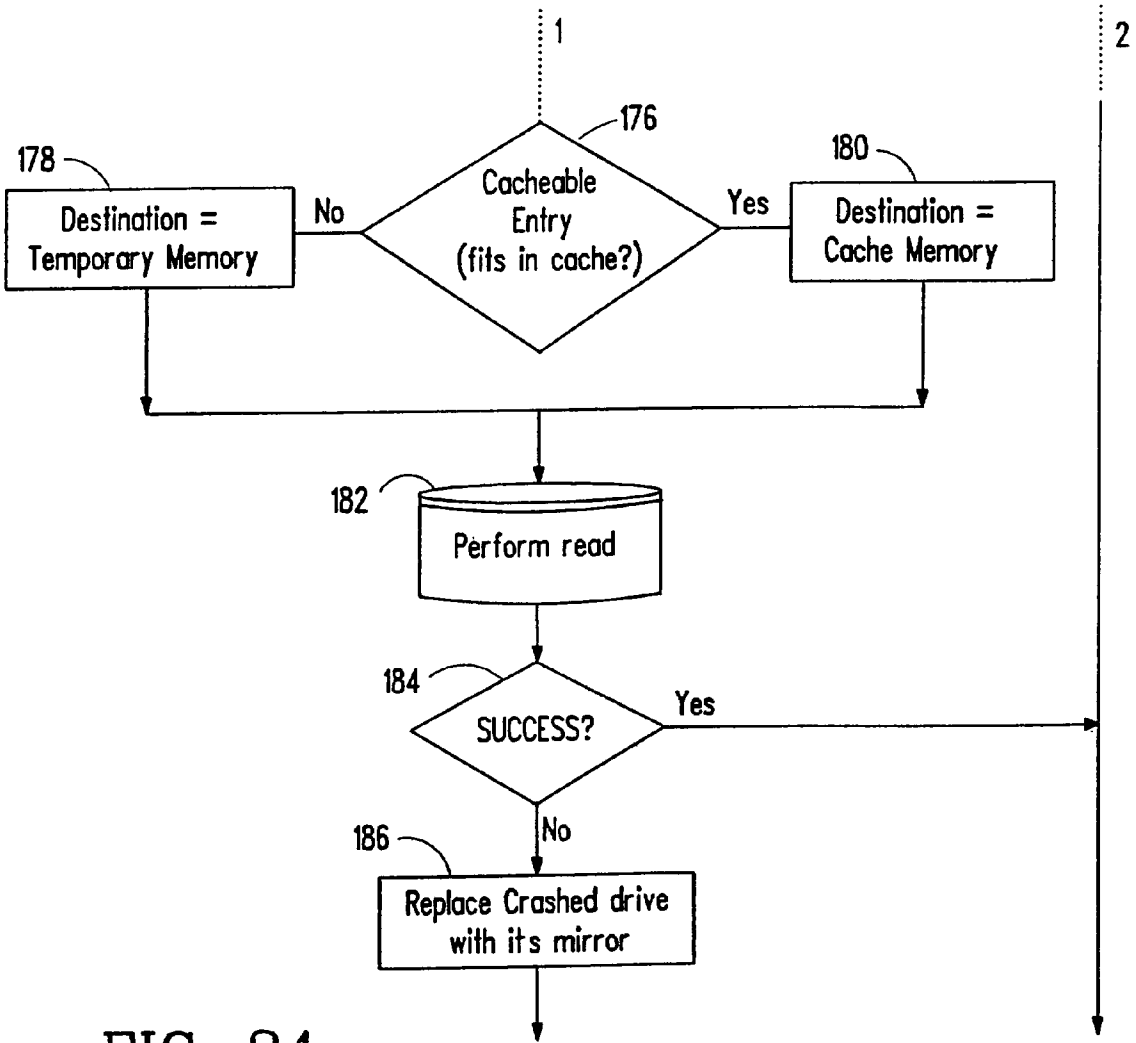
Figure 25:
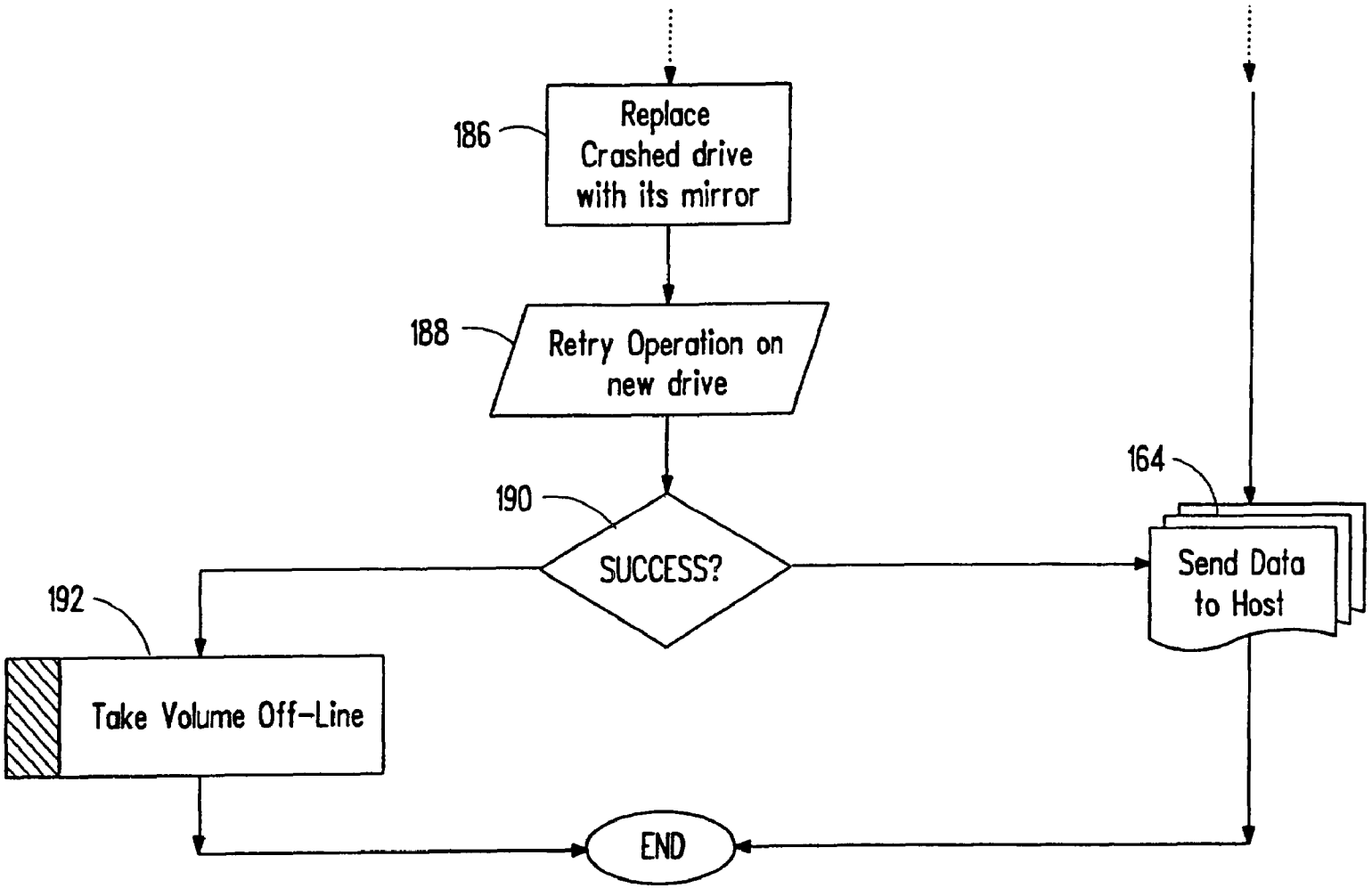
Figure 26:
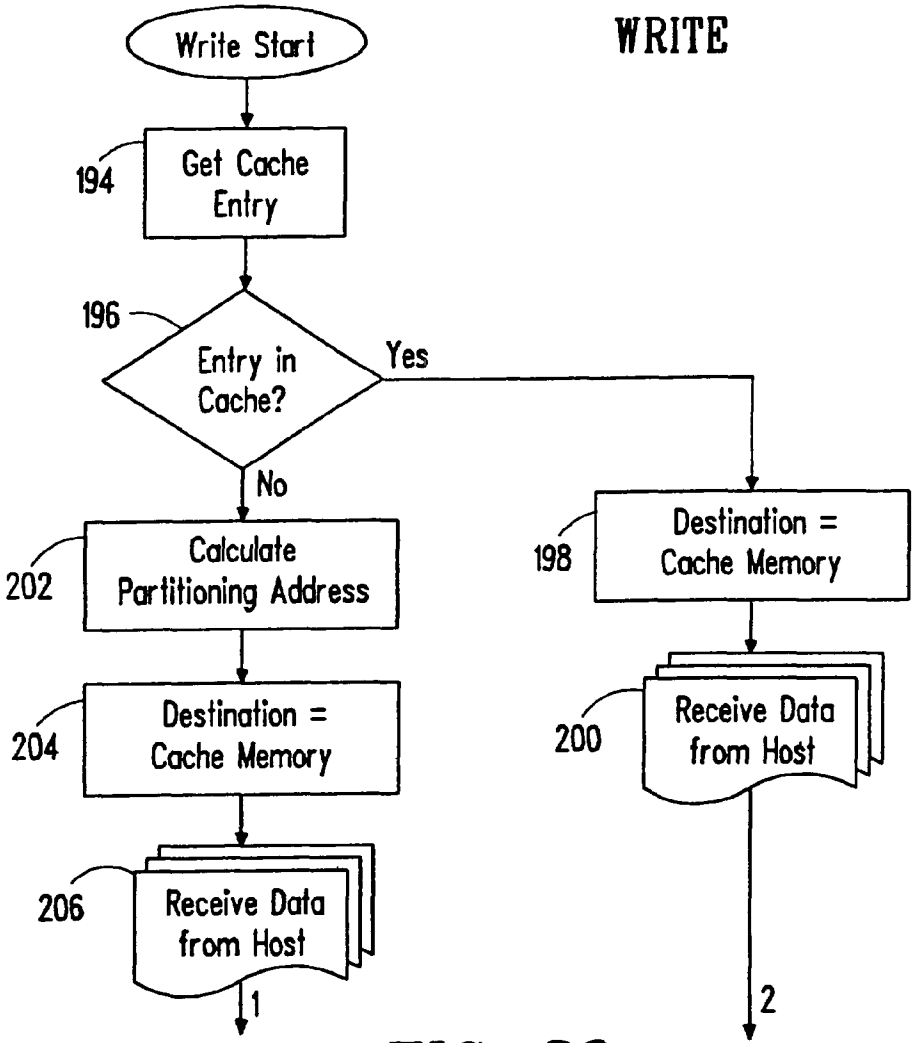
FIGS. 26-29 are flow diagrams which illustrate a WRITE cycle.
Figure 27:
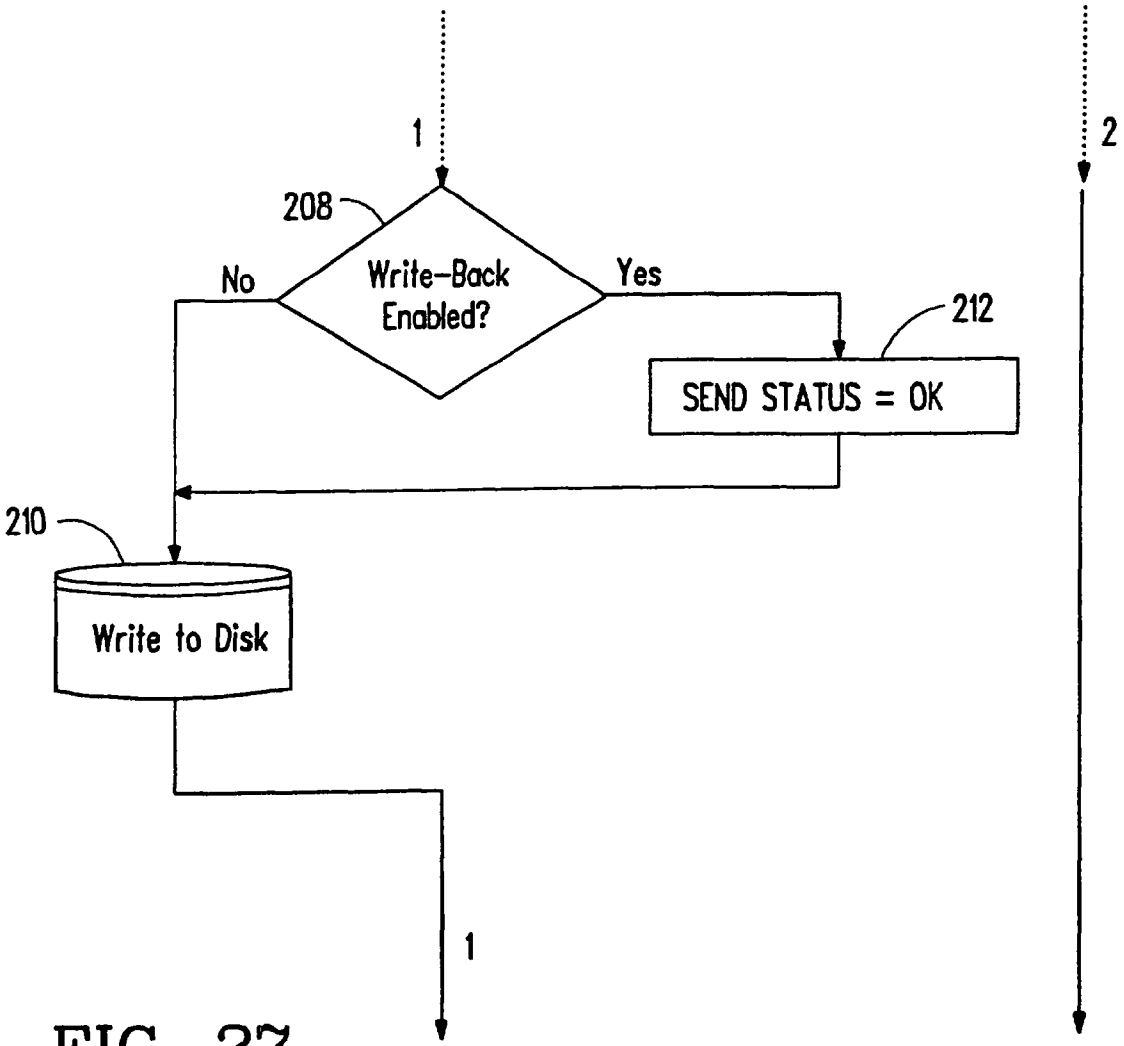
Figure 28:
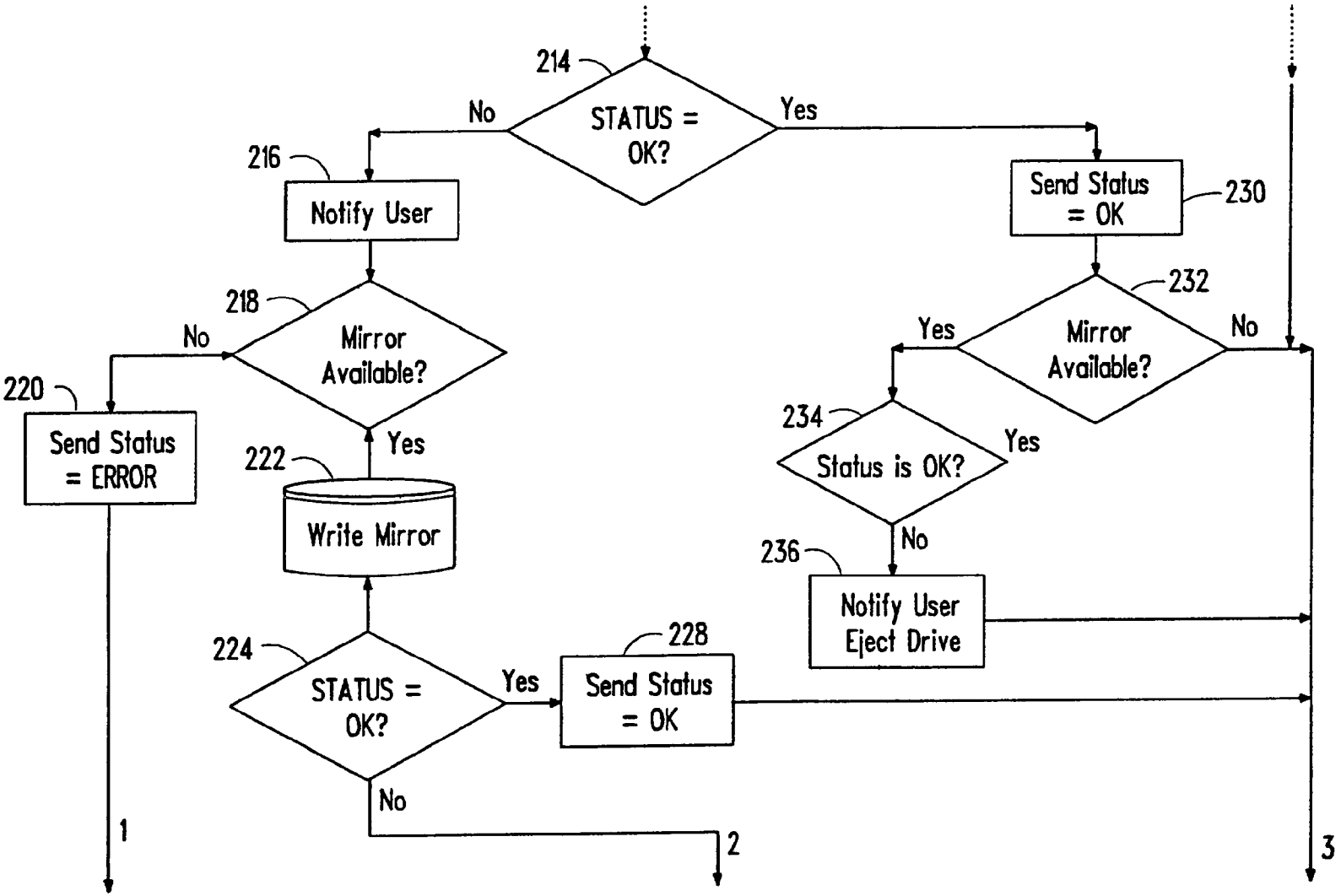
Figure 29:
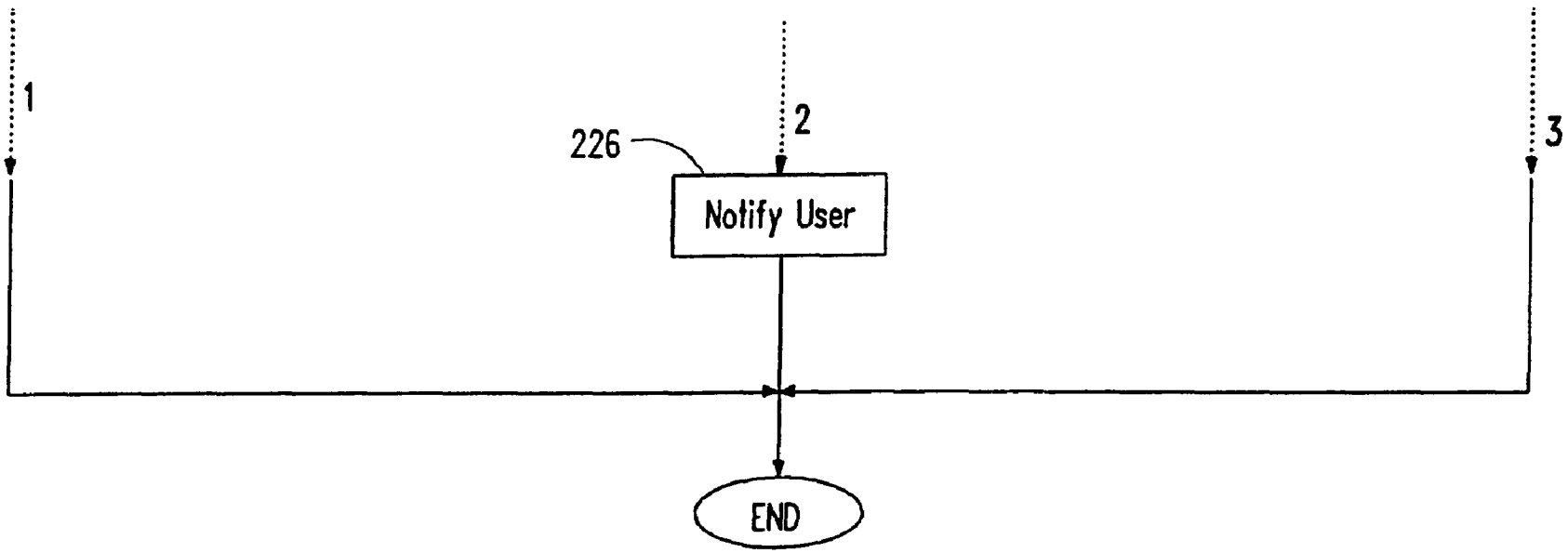

A READ cycle is illustrated in FIGS. 23-25. In a first step 160 a cache entry is retrieved. If the entry is in the cache as determined in step 162, the data is sent 164 to the host and the cycle ends. If the entry is not in the cache, a partitioning address is calculated 166 and a determination 168 is made as to whether the data lies on the first half of the disk. If not, the source device is set 170 to be the master. If the data lies on the first half of the disk, mirror availability is determined 172. If no mirror is available, the source device is set 170 to be the master. If a mirror is available, the source device is set 174 to be the mirror. In either case, it is next determined 176 whether the entry is cacheable, i.e., whether the entry fits in the cache. If not, the destination is set 178 to be temporary memory. If the entry is cacheable, the destination is set 180 to be cache memory. A read is then performed 182 and, if successful as determined in step 184, the data is sent 164 to the host. If the read is not successful, the storage device is replaced 186 with the mirror and the read operation is retried 188 on the new drive. If the read retry is successful as determined in step 190, the data is sent 164 to the host. If the read is unsuccessful, the volume is taken off-line 192.

A WRITE cycle is illustrated in FIGS. 26-29. In an initial step 194 an attempt is made to retrieve the entry from the cache. If the entry is in the cache as determined in step 196, the destination is set 198 to be the cache memory and the data is received 200 from the host. If the entry is not in the cache, a partitioning address is calculated 202, the destination is set 204 to cache memory, and the data is received 206 from the host. A determination 208 is then made as to whether write-back is enabled. If write back is not enabled, a write 210 is made to the disk. If write-back is enabled, send status is first set 212 to OK, and then a write 210 is made to the disk. A status check is then executed 214 and, if status is not OK, the user is notified 216 and a mirror availability check 218 is done. If no mirror is available, an ERROR message is produced 220. If a mirror is available, a write 222 is executed to the mirror disk and a further status check is executed 224. If the status check 224 is negative (not OK), the user is notified 226. If the status check 224 is positive, send status is set to OK 228. If status is OK in status check 214, send status is set to OK 230 and a mirror availability check is executed 232. If no mirror is available, flow ends. If a mirror is available, a mirror status check is executed 234, and the user is notified 236 if the result of the status check is negative.

Other modifications and alternative embodiments of the present invention will become apparent to those skilled in the art in light of the information provided herein. Consequently, the invention is not to be viewed as limited to the specific embodiments disclosed herein.

What is claimed is:

1. A device for providing an interface between at least one client computer and at least one storage device, the client computer having a first microprocessor for running a software application and a first operating system which produce I/O commands, the storage device containing at least one file, comprising:

a file management system operative to convert the I/O commands from the software application and said first operating system in the client computer to high level commands to a selected format, said file management system further operative to receive said high level commands and convert said high level commands to compatible I/O commands;

a second microprocessor operative to execute said high level commands received from said file management system and access the storage device to copy data in said intermediate common format from the client computer to at least one storage device wherein said second microprocessor employs a second operating system distinct from said first operating system; and a file device driver interfacing said first operating system and the file management system by functioning to receive data and commands from the client computer and redirect the received data and commands to said file management system.

2. The interface device of claim 1 wherein said file device driver resides in the client computer.

3. The interface device of claim 2 a wherein said file management system further includes a transport driver having first and second sections for facilitating transfer of data and commands between said file device driver and said file management system, said first section receiving data and commands from said file device driver and said second section relaying such data and commands to said file management system.

4. The interface device of claim 3 wherein said file management system includes a file system supervisor operative to select file-level applications for receipt of the data from the client computer and provide storage commands.

5. The interface device of claim 4 wherein said file system supervisor is further operative to select a storage device or storage of data received from the client computer.

6. The interface device of claim 4 wherein said file system supervisor is further operative to break data received from the client computer down into blocks.

7. The interface device of claim 6 wherein said file management system further includes at least one device handler operative to interface said file system supervisor with the at least one storage device by driving the at least one storage device in response to said storage commands from said file system supervisor.

8. The interface device of claim 7 wherein said file management system further includes a device handler for each at least one storage device.

9. The interface device of claim 3 further including a kernel operative to directly execute I/O commands from the software application in the client computer.

10. The interface driver of claim 9 wherein said kernel utilizes the first operating system.

11. The interface device of claim 10 wherein said SMA kernel includes a scheduler for supervising flow of data by selectively relaying blocks of data to RAID applications.

12. A device for providing an interface between at least one client computer and at least one storage device, the client computer having a first microprocessor for running a software application and a first operating system which produce high level I/O commands, the storage device containing at least one file, comprising:

a plurality of storage devices each having a different type storage media;

a second microprocessor interposed between the client computer and said plurality of storage devices to control access thereto, said second microprocessor processing said high level I/O commands to control the power supplied to individual storage devices of said plurality of storage devices.

13. The interface device of claim 12 wherein said interconnection device executes a reconfiguration routine which identifies storage device ID conflicts among said plurality of storage devices.

14. The interface device of claim 13 wherein said reconfiguration routine provides powers-up individual storage devices of said plurality of storage devices while executing.

15. The interface device of claim 14 wherein when a storage device ID conflict is detected said reconfiguration routing changes the ID of at least one of the storage devices in conflict.

16. The interface device of claim 12 wherein said interconnection device executes a media tracking routine which identifies storage device types.

17. The interface device of claim 16 wherein said media tracking routine automatically selects a storage device for WRITE operations.

18. The interface device of claim 17 wherein said media tracking routine selects said storage device based upon the block size of the data to be stored.

19. The interface device of claim 17 wherein said media tracking routine selects said storage device based upon media write speed.

20. The interface device of claim 12 including a plurality of power supplies for supplying power to said storage devices, said storage devices being grouped into racks such that at least one global power supply is available to serve as backup to a plurality of such racks of power supplies.

21. The interface device of claim 12 including a plurality of power supplies for supplying power to said storage devices, said storage devices being grouped into racks such that each rack is associated with a global power supply available to serve as backup to the rack with which the global power supply is associated.

22. The interface device of claim 12 including a plurality of power supplies, said microprocessor controlled interconnection device monitoring said power supplied to detect failed devices.

23. The interface connector of claim 22 wherein said storage devices are disposed in a protective chassis, and failed devices are automatically ejected from said chassis.

24. The interface connector of claim 12 further including a redundant array of independent disks.

25. The interface connector of claim 24 further including an XOR router having dedicated XOR hardware.

26. The interface connector of claim 25 wherein at least one surface of each disk in said redundant array of independent disks is dedicated to parity operations.

27. The interface connector of claim 25 wherein at least one disk in said redundant array of independent disks is dedicated to parity operations.

28. The interface connector of claim 25 wherein said disks of said redundant array of independent disks are arranged on a plurality of separate channels.

29. The interface connector of claim 28 wherein each said channel includes a dedicated memory pool.

30. The interface connector of claim 29 wherein said channels are interconnected by first and second thirty-two bit wide busses.

31. The interface connector of claim 24 further including a graphic user interface for displaying storage system status and receiving commands from a user.

32. The interface connector of claim 24 including hardware for data splitting and parity generation "on the fly" with no performance degradation.

*33. An interface system between a client network configured to provide data and input/output commands and a data storage system having at least one storage device, said interface system comprising:*

*a file management system configured to manage the movement of information between said client network and*

*said data storage system, said file management system comprising a first arrangement in communication with a second arrangement,*

*the first arrangement configured to receive said input/output commands to implement storage of said data in said data storage system when a first set of conditions exists; and*

*the second arrangement in communication with said first arrangement, said client network and said at least one storage device, said second arrangement configured to manage the flow of data between said storage device and said client network when a second set of conditions exists, wherein said first arrangement comprises a file system supervisor program comprising a file device driver configured to receive and convert said input/output commands having a first format to an intermediate format different than said first format and wherein said file system supervisor is configured to receive said input/output commands in said intermediate format and said second arrangement is a storage management architecture (SMA) kernel.*

*34. The interface system of claim 33 wherein said client network is configured to operate according to a first format and said storage device is configured to operate according to a format compatible with said first format and wherein said data flows between said client network and said storage device.*

*35. The interface system of claim 34 wherein data flows in both directions between said client network and said data storage system.*

*36. The interface system of claim 34 further comprising at least one device handler between the first arrangement and the second arrangement, said at least one device handler configured to isolate the first arrangement from the storage device.*

*37. The interface system of claim 33 wherein said storage device is configured to operate according to said intermediate format and data flows between said client network and said storage device via said file management system.*

*38. The interface system of claim 37 wherein said file device driver is configured to receive said data in said first format and convert said received data to said intermediate format.*

*39. The interface system of claim 38 further comprising a transport driver in communication with said file device driver and said first arrangement, the transport driver configured to receive said data and said input/output commands in said intermediate format and relay said data and said input/output commands to said first arrangement.*

*40. The interface system of claim 39 wherein said client network comprises at least one computer configured to run a selected operating system.*

*41. The interface system of claim 39 wherein said client network comprises a multiplicity of computers, each of said multiplicity of computers configured to run one of a selected group of operating systems to provide outputs in one of a selected plurality of first formats.*

*42. The interface system of claim 41 wherein said file device driver resides in a computer in said client network.*

*43. The interface system of claim 41 further comprising a host computer configured to run said first arrangement, said file device driver, said second portion of said transport driver and said second arrangement.*

*44. The interface system of claim 41 wherein said file management system is configured to operate according to one of said selected operating systems, and said data files and input/output commands converted by file device driver are compatible to said operating system.*

*45. The interface system of claim 39 wherein data flows in both directions between said client network and said data storage system.*

*46. The interface system of claim 33 further comprising a transport driver in communication with said file device driver and said first arrangement, the transport driver configured to receive said input/output commands in said intermediate format and relay said input/output commands to said first arrangement.*

*47. The interface system of claim 46 wherein said transport driver comprises a first portion associated with said client network and a second portion associated with said first arrangement and further comprising a communication link configured to connect said first and second portions.*

*48. The interface system of claim 47 wherein said communication link is selected from the group consisting of SCSI-2, SCSI-3, fiber link, 802.3, 802.5, synchronous RS232, wireless RF and wireless IR.*

*49. The interface system of claim 48 wherein data flows in both directions between said client network and said data storage system.*

*50. The interface system of claim 46 wherein data flows in both directions between said client network and said data storage system.*

*51. The interface system of claim 33 wherein said client network comprises at least one computer configured to run a selected operating system.*

*52. The interface system of claim 33 wherein said client network comprises a multiplicity of computers, each of said multiplicity of computers configured to run one of a selected group of operating systems to provide outputs in one of a selected plurality of first formats.*

*53. The interface system of claim 33 wherein said file device driver resides in a computer in said client network.*

*54. The interface system of claim 33 wherein data flows in both directions between said client network and said data storage system.*

*55. The interface system of claim 33 further comprising at least one device handler between the first arrangement and the second arrangement, said at least one device handler configured to isolate the first arrangement from the storage device.*

*56. The interface system of claim 55 wherein said storage device is configured to operate according to a different format than said first arrangement.*

*57. The interface system of claim 33 further comprising at least one device handler between the first arrangement and the second arrangement, said at least one device handler configured to isolate the first arrangement from the storage device so that configuration of the storage device may differ from the configuration of the first arrangement.*

*58. The interface system of claim 57 wherein said at least one device handler comprises a plurality of device handlers associated with a plurality of storage devices, at least one of said plurality of storage devices having a different configuration than the other device handler.*

*59. The interface system of claim 33 wherein said at least one storage device comprises a plurality of storage devices.*

*60. The interface system of claim 33 wherein said plurality of storage devices comprises a redundant array of independent disks (RAID).*

*61. The interface system of claim 60 wherein at least one surface of each disk in said redundant array of independent disks is dedicated to parity operations.*

*62. The interface system of claim 60 wherein at least one disk in said redundant array of independent disks is dedicated to parity operations.*

*63. The interface system of claim 60 wherein said disks of said redundant array of independent disks are arranged on a plurality of separate channels.*

*64. A system for providing an interface between at least one client computer and at least one storage device, the client computer having a first microprocessor configured to run a software application and a first operating system which produce I/O commands, wherein the client computer and the system are configured to be communicatively linked to each other via a data communication network, the system comprising:*

*a transport driver operative to receive high level commands in an intermediate common format from the client computer via said network and convert said high level commands in the intermediate common format to high level I/O commands;*

*a second microprocessor operative to execute said high level I/O commands received from said transport driver and access the at least one storage device to copy data from the client computer to the at least one storage device wherein said second microprocessor employs a second operating system distinct from said first operating system.*

*65. The system of claim 64, wherein the transport driver is further operative to convert high level I/O commands to high level commands in the intermediate common format.*

*66. The system of claim 65, wherein the transport driver is further operative to send high level commands in the intermediate common format over the network to the client computer.*

*67. The system of claim 64, wherein the high level I/O commands are SCSI commands.*

*68. The system of claim 64, wherein the storage device comprises a redundant array of independent disks (RAID) device.*

*69. The system of claim 68, wherein the RAID device comprises a processor.*

*70. The system of claim 64, wherein the high level I/O commands are commands selected from the group of commands consisting of read, write, lock, and copy.*

*71. The system of claim 64, wherein said network is an 802.3 network.*

*72. The system of claim 64, wherein said network is an 802.5 network.*

*73. The system of claim 64, wherein said network is a wireless network.*

*74. The system of claim 64, further comprising a plurality of storage devices.*

*75. The system of claim 74, further comprising a plurality of device handlers to accommodate said plurality of storage devices.*

*76. A system for providing an interface between at least one client computer and at least one storage device, the client computer having a first microprocessor configured to run a software application and a first operating system which produce I/O commands, wherein the client device and the system are configured to be communicatively linked to each other via a data communication network, the system comprising:*

*a transport driver operative to receive high level commands in an intermediate common format from the client computer via said network and convert said high level commands in the intermediate common format to high level I/O commands;*

*a device handler operative to execute said high level I/O commands received from said transport driver and access the at least one storage device to copy data from the client computer to the at least one storage device; and*

*a second microprocessor operative to execute said transport driver and said device handler, wherein said second microprocessor employs a second operating system distinct from said first operating system.*

*77. The system of claim 76, further comprising a plurality of storage devices.*

*78. The system of claim 77, further comprising a plurality of device handlers to accommodate said plurality of storage devices.*

*79. The system of claim 76, wherein the high level I/O commands are commands selected from the group of read, write, lock, and copy.*

*80. The system of claim 76, wherein the high level I/O commands are SCSI commands.*

*81. The system of claim 76, wherein the storage device comprises a redundant array of independent disks (RAID) device.*

*82. The system of claim 81, wherein the RAID device comprises a processor.*

*83. The system of claim 76, wherein said network is an 802.3 network.*

*84. The system of claim 76, wherein said network is an 802.5 network.*

*85. The system of claim 76, wherein said network is a wireless network.*

* * * * *

UNITED STATES PATENT AND TRADEMARK OFFICE

CERTIFICATE OF CORRECTION

PATENT NO. : RE42,860 E
APPLICATION NO. : 10/210592
DATED : October 18, 2011
INVENTOR(S) : Velez-McCaskey et al.

It is certified that error appears in the above-identified patent and that said Letters Patent is hereby corrected as shown below:

On the Title Page:

Item [64], Replace sub-heading, PCT Filed: with sub-heading, Filed.

Signed and Sealed this
First Day of November, 2011

David J. Kappos

David J. Kappos
*Director of the United States Patent and Trademark Office*